US012756424B2

(12) United States Patent
Polydoros et al.

(10) Patent No.: US 12,756,424 B2
(45) Date of Patent: Oct. 6, 2026

(54) CLUSTERED COHERENT DISTRIBUTED SPATIAL MULTIPLEXING IN WIRELESS COMMUNICATION NETWORKS

(71) Applicant: TrellisWare Technologies, Inc., San Diego, CA (US)

(72) Inventors: Andreas Polydoros, San Diego, CA (US); Cenk Köse, San Diego, CA (US)

(73) Assignee: TrellisWare Technologies, Inc., San Diego, CA (US)

(*) Notice: Subject to any disclaimer, the term of this patent is extended or adjusted under 35 U.S.C. 154(b) by 265 days.

(21) Appl. No.: 18/725,389

(22) PCT Filed: Dec. 28, 2022

(86) PCT No.: PCT/US2022/054164
§ 371 (c)(1),
(2) Date: Jun. 28, 2024

(87) PCT Pub. No.: WO2023/129599
PCT Pub. Date: Jul. 6, 2023

(65) Prior Publication Data
US 2025/0175213 A1 May 29, 2025

Related U.S. Application Data

(60) Provisional application No. 63/294,292, filed on Dec. 28, 2021.

(51) Int. Cl.
*H04B 7/024* (2017.01)
*H04B 7/08* (2006.01)
*H04W 40/06* (2009.01)

(52) U.S. Cl.
CPC ........... *H04B 7/024* (2013.01); *H04B 7/0857* (2013.01); *H04W 40/06* (2013.01)

(58) Field of Classification Search
CPC .... H04B 7/024; H04B 7/0617; H04B 7/0857; H04W 28/021; H04W 28/0247; H04W 40/06
See application file for complete search history.

(56) References Cited

U.S. PATENT DOCUMENTS 12,625,226 B2 * 5/2026 Au .......................... G01S 7/006
2014/0126567 A1 5/2014 Husain et al.
(Continued)

OTHER PUBLICATIONS

International Search Report and Written Opinion mailed on Jul. 13, 2023 for International Patent Application No. PCT/US2022/054164, of TrellisWare Technologies, Inc., 29 pages.
(Continued)

*Primary Examiner* — Brian D Nguyen
(74) *Attorney, Agent, or Firm* — Ashurst Perkins Coie US LLP

(57) ABSTRACT

Embodiments of the disclosed technology are directed to spatially multiplexing different digital data streams which are generated within a distributed network (e.g., MANET, cellular, or Wi-Fi) and are simultaneously transmitted towards a destination radio with multiple antenna elements. An example method for collaborative communication includes clustering the plurality of nodes into a plurality of clusters such that each of the plurality of clusters communicates with a distinct antenna of the plurality of antennas, and performing distributed beamforming in each of the plurality of clusters to transmit a corresponding message of multiple messages directed to the distinct antenna. The described embodiments enable improved performance over existing systems, e.g., increased outage capacity with increasing cluster size.

20 Claims, 12 Drawing Sheets

(56) References Cited

U.S. PATENT DOCUMENTS

| | | | | |
|---|---|---|---|---|
| 2015/0180560 | A1 | 6/2015 | Van Nee et al. | |
| 2019/0253131 | A1 | 8/2019 | Buer et al. | |
| 2021/0144732 | A1 | 5/2021 | Köse | |
| 2021/0211169 | A1 | 7/2021 | Xue et al. | |
| 2022/0163579 | A1* | 5/2022 | Li | G01R 29/0878 |
| 2023/0273291 | A1* | 8/2023 | Ozturk | G01S 7/006<br>342/52 |
| 2024/0021522 | A1* | 1/2024 | Acikalin | H10W 70/65 |

OTHER PUBLICATIONS

Supplementary European Search Report mailed on Jan. 26, 2026 for European Application No. 22917319.0, 13 pages.

* cited by examiner

CLUSTERED COHERENT DISTRIBUTED SPATIAL MULTIPLEXING IN WIRELESS COMMUNICATION NETWORKS

CROSS-REFERENCE TO RELATED APPLICATION

This application is a 371 U.S. National Stage application of International Application No. PCT/US2022/054164, filed Dec. 28, 2022, which claims priority to U.S. Provisional Application 63/294,292 filed on Dec. 28, 2021, the disclosure of which is hereby incorporated by reference herein in its entirety.

TECHNICAL FIELD

This document generally relates to wireless networks, and more specifically, to mobile ad-hoc networks (MANETs) that are configured to perform spatial multiplexing.

BACKGROUND

Mobile ad-hoc networks (MANETs) may include spatially distributed, single-antenna, power-limited radio nodes, which may be dynamic, not fully connected, and operating in multipath fading propagation environments. These nodes can cluster and/or collaborate to relay multiple distinct messages to a destination node with multiple antennas.

SUMMARY

Embodiments of the disclosed technology are directed to multiplexing different digital data streams which are generated within a MANET and are simultaneously transmitted towards a destination radio with multiple antenna elements ("antennas").

In an example aspect, a system for collaborative communication includes a plurality of nodes and a destination node comprising a plurality of antennas. In accordance with the disclosed technology, the system is configured to group the plurality of nodes into a plurality of clusters such that each of the plurality of clusters is configured to simultaneously transmit a distinct message directed to a corresponding antenna of the plurality of antennas. Herein, each node in each of the plurality of clusters is configured, prior to transmitting the corresponding distinct message, to receive, from the corresponding antenna, a probe, and generate the corresponding distinct message by applying a phase correction, wherein computing the phase correction is based on the probe.

In another example aspect, a method for collaborative communication from a plurality of nodes to a destination node comprising a plurality of antennas includes clustering the plurality of nodes into a plurality of clusters such that each of the plurality of clusters communicates with a distinct antenna of the plurality of antennas, and performing distributed beamforming in each of the plurality of clusters to transmit a corresponding message of multiple messages directed to the distinct antenna.

In yet another example, the above-described method is embodied in the form of processor-executable code and stored in a computer-readable program medium.

In yet another example, a device that is configured or operable to perform the above-described method is disclosed.

The above examples and other aspects and their implementations are described in greater detail in the drawings, the descriptions, and the claims.

DETAILED DESCRIPTION

Figure 1A:
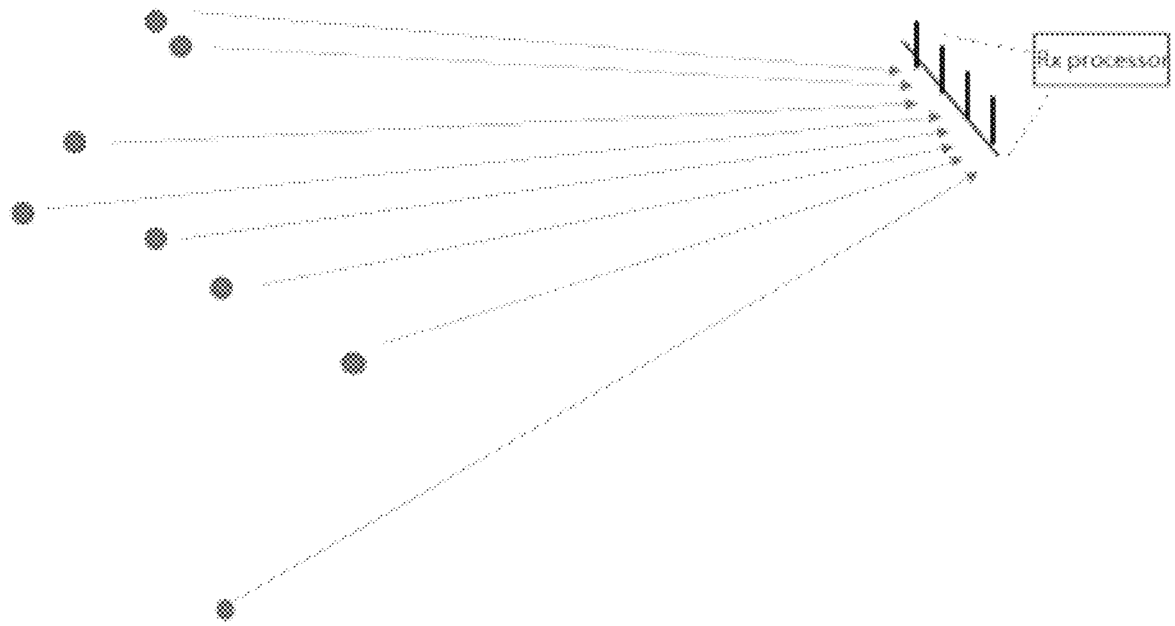
FIGS. 1A and 1B show examples of distributed spatial multiplexing.

A mobile ad hoc network (MANET) is a continuously self-configuring, infrastructure-less network of mobile devices connected wirelessly. A MANET typically includes spatially distributed, single-antenna, power-limited radio nodes, which may be both terrestrial and non-terrestrial. In an example, the network may be dynamic (nodes are moving) and may not be fully connected (multiple hops may be needed for full network coverage). In another example, the radios may operate in multipath fading propagation environments, and may employ constant-envelope (CE) modulations for increased power efficiency.

Section headings are used in the present document to improve readability of the description and do not in any way limit the discussion or embodiments (and/or implementations) to the respective sections only.

1 Overview of Distributed Beamforming (DBF) and Clustered Coherent Distributed Spatial Multiplexing (CC DSM)

In various implementations and operational scenarios, the nodes (radios) of a MANET wish to send information to a specific location, to a "destination node" (or "sink"). The general action of sending a common message from a set of distributed radio nodes to a destination in a phase-coherent manner is termed distributed beamforming (DBF). Coherent reception significantly enhances the received power compared to incoherent reception and is desirable for a variety of reasons. One possibility is to reach a remotely located destination node which is not reachable via straightforward incoherent communication protocols; thus, the destination is assumed to be at a very remote location, where "remote" may be interpreted to mean well outside the network diameter. Distributed beamforming was originally proposed to improve the data exfiltration capability of sensor networks consisting of static low-powered nodes with narrowband (low data rate) measurements. Its benefits included increased energy efficiency, and consequently, increased operational longevity. In traditional DBF systems, the destination node typically included a single antenna element.

When the destination node possesses more co-located antenna elements than just one, the degrees of freedom expand to that number and spatial multiplexing is possible. The general theory is known under the broad term "MIMO" (multiple-input, multiple-output), which however typically implies co-located transmit as well as co-located receive antennas. The co-located transmit antennas may measure and exploit the full channel matric information (full "CSI"), in which case a process known as singular value decomposition (SVD) can be employed to provide maximum capacity exploitation. However, in MIMO systems, full knowledge of the ($N_T$, $N_R$) channel matrix is essential in performing SVD. In co-located transmit antennas such information can be made available at the common baseband system of the transmitter. However, when the nodes (and their antennas) are distributed in space, such sharing of information is burdensome: channel gains must be collected individually at the various nodes, then sent to a common processing center which will perform SVD, then proper control information must be sent back to all transmit nodes, which must then perform vector transmission on the commonly known message (as per the SVD formulation), not just phasor adjustment of the transmission parameters. In general, SVD is considered cumbersome even in collocated transmit antennas, and practically impossible in distributed systems. In principle, however, it is possible and can be thought of as an upper bound on achievable performance. DBF, on the other hand, performed from many transmit nodes emitting the same message towards a single-antenna receiver via phasor adjustment is provably simple and practical. The difference, of course, is that SVD achieves multiplexing of many streams (as many as the channel profile will allow reliably) whereas DBF (as described in Section 2) sends only one stream at a time.

The described embodiments are directed to spatially multiplexing different digital data streams which are generated within a distributed mobile ad hoc network (MANET) and are simultaneously transmitted towards a destination radio with a multiple apertures or antennas (and which is denoted the "receive array"). As used herein, the term "distributed spatial multiplexing" (DSM) means any broad system of simultaneous multi-stream transmission in a MANET context due to the spatially distributed aspect of the transmitting MANET nodes. In DSM, illustrated in FIG. 1A, multiple data streams carrying different data (messages) are sent contemporaneously to the destination. This destination is able to receive and de-multiplex these multiple streams via proper processing due to the multiplicity of receive elements (antennas), which are co-located at the destination site. In an example, the destination node supports more than one antenna, whereas the distributed transmitting radios (nodes) possess a single antenna each. In another example, each transmitting node may possess more than one antenna.

The transmitter coordination and cooperation framework described herein is based on DBF (described in Section 2) for the scenario where multiple transmitters cooperate in an open-loop fashion and emit the same message towards a destination receiver endowed with a single antenna ($N_R$=1). Each of the transmitters in Section 2 possess and send a common (single) data stream ("message") to the destination receiver (node).

Figure 1B:
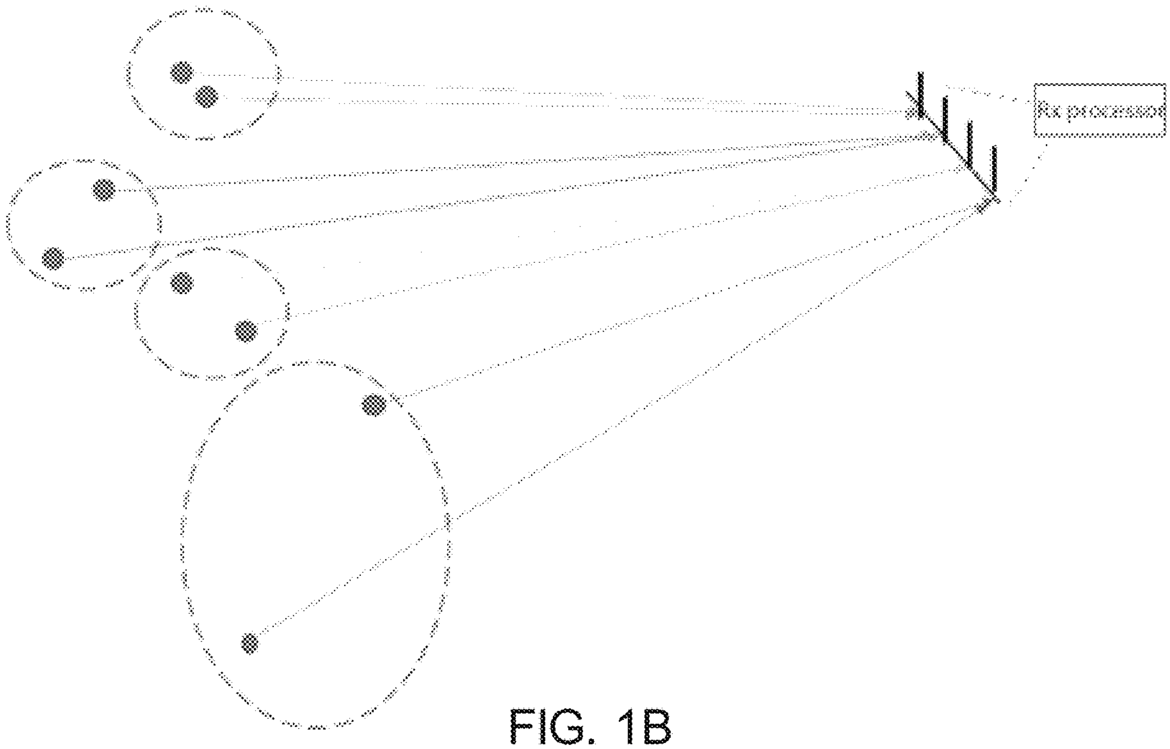

Embodiments of the disclosed technology extend the distributed beamforming framework to include scenarios in which the destination node possesses more than one antenna ($N_R$>1) and $N_T$ transmitters collectively and simultaneously send more than one data streams. In an example, the number of streams is less than or equal than $N_R$. Furthermore, the $N_T$ transmitters are first grouped into C clusters via a predefined protocol prior to using distributed beamforming (including some form of phase alignment) within each cluster to transmit a distinct message to a corresponding antenna of the $N_r$ antennas at the destination node. FIG. 1B shows an example of clustered network nodes that are performing clustered coherent distributed spatial multiplexing (CC DSM) to a receive array with multiple antennas. The described embodiments multiplex more than one data stream simultaneously to advantageously provide an enhanced sum rate over the channel versus single-stream transmissions.

Although the present disclosure discusses clustered coherent distributed spatial multiplexing (CC DSM) in the context of MANETs in which mobile nodes cooperate to communicate with distinct antennas of a receive array, the described embodiments are applicable to cellular systems (e.g., 3GPP, 4G, 5G, 5G-NR) in which wireless devices (e.g., cellphones) cooperate to communicate with multiple antennas at a base station (e.g., eNB, gNB) and Wi-Fi networks (e.g., IEEE 802. family) in which wireless devices cooperate to communicate with multiple antennas of a local router or Wi-Fi access points (APs). In addition, low-power Internet-of-Things (IoT) applications can leverage the described embodiments to provide solutions for intelligent transportation networks, e.g., to perform tasks that include parking, automated driving, lane changes, and the like.

2 Example Embodiments for DBF

In some embodiments, a method of distributed beamforming (DBF) from a set of radio network nodes $N_i$; i=1, 2, . . . , K, which are spatially distributed, towards a remote collaborating radio destination node D comprises four stages.

Stage 1. Each network node gets possession of a common message sent by a source S, which is the message to be beam-formed towards the destination D.

Stage 2. The network nodes self-cohere via a sequence of bidirectional signal exchanges (or a combination of signal and message exchanges), performed between chosen pairs of nodes. This results in all nodes in the network having been included in the self-coherence process and having derived and stored a phase correction value.

Stage 3. Each network node receives a broadcast probe signal from the destination node D. Based on this probe, each network node estimates a complex-valued, multipath-fading baseband channel model, identifies the strongest tap in the channel model, and computes the phase (argument) of the strongest complex-valued tap. In some embodiments, all the network nodes receive the probe from the destination at roughly the same time (e.g., within a timeslot, or within adjacent timeslots).

Stage 4. Each network node quasi-synchronously (e.g., within a pre-defined turn-around time upon destination-probe reception) transmits the common message with a total correction phase added to the phase (argument) of the complex baseband values representing the information stream (of the common message). The total correction phase is equal to the negative of the sum of the node's phase correction value (as derived in Stage 2) and the phase (argument) of the strongest complex-valued tap (as estimated in Stage 3).

In some embodiments, and for constant envelope (CE) modulated signals, baseband phase correction can be implemented simply by an index shift into the look-up table that generates the information carrying digital phase sequence, thereby maintaining the constant envelope property for the transmitted signal.

In some embodiments, a network node may perform the four stages in an order different from that described above, as long as Stage 4 (which includes the actual beamforming operation) is performed last. For example, the network node may first receive a probe from the destination and compute the phase of the strongest tap of the channel estimation (Stage 3), then receive the common message (Stage 1), followed by participating in the self-coherence process with the other network nodes to derive its phase correction value (Stage 2), and finally perform the beamforming operation (Stage 4). For another example, the network node may first participate in the self-coherence process with the other network nodes to derive its phase correction value (Stage 2), then receive a probe from the destination and compute the phase of the strongest tap of the channel estimation (Stage 3), followed by receiving the common message (Stage 1), and finally perform the beamforming operation (Stage 4).

In some embodiments, the four-stage process described above produces a composite (co-transmitted, superimposed) signal at the destination node which has a larger signal-to-noise ratio (SNR) than what would have been received had the nodes co-transmitted in a phase-incoherent manner, thereby producing a distributed beamforming gain.

In some embodiments, the four-stage process described above can be adapted to simultaneously distribute the common message to multiple destinations.

FIGS. 2A-2D shows the four stages of an exemplary embodiment for distributed collaborative beamforming, in accordance with the disclosed technology.

Figure 2B:
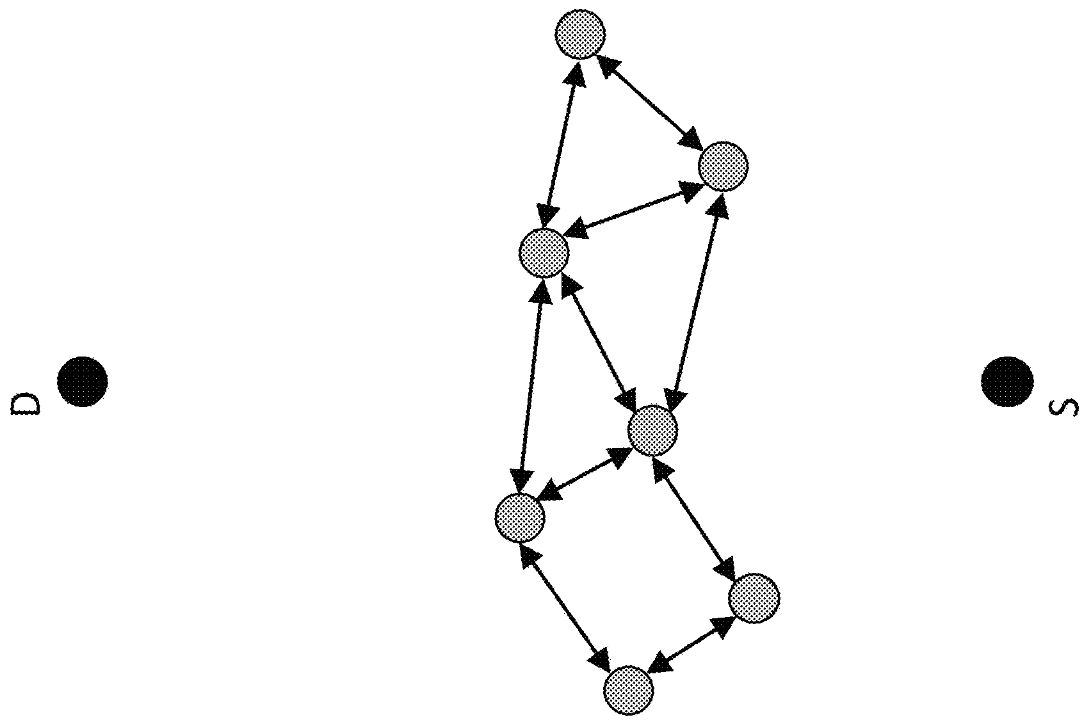
FIGS. 2A-2D show stages of an example distributed beamforming (DBF) method.
Figure 2A:
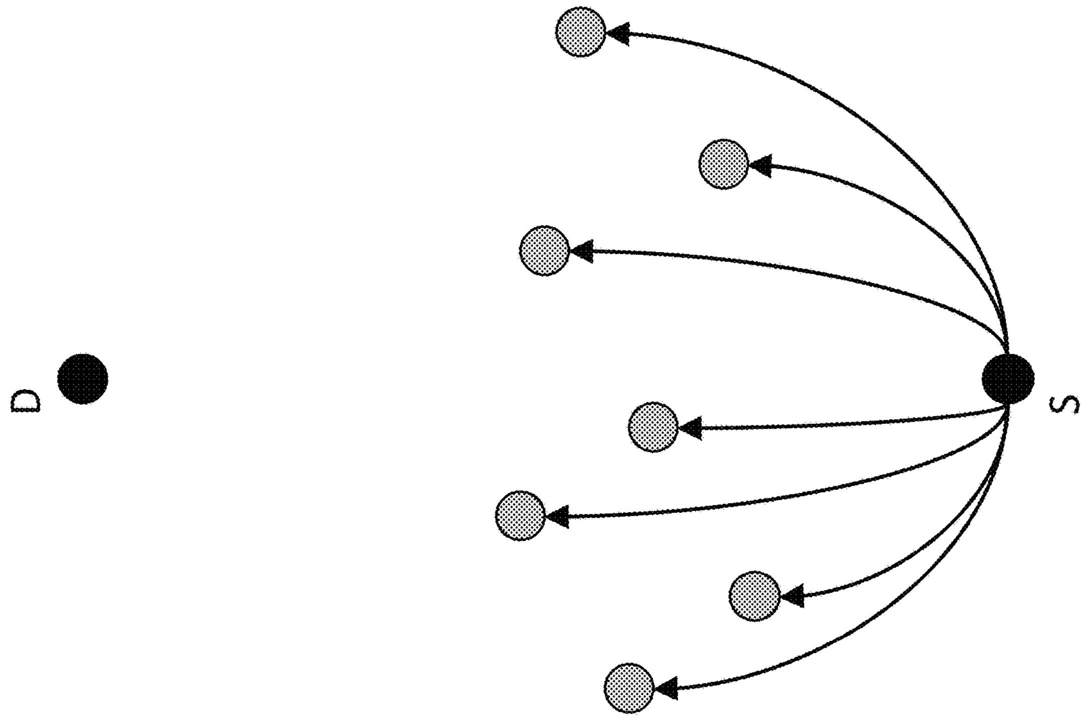

FIG. 2A shows an example of the first message-sharing stage, wherein the K network nodes (shaded grey) get possession of a common message from a source(S). In some embodiments, the message can be distributed via broadcast transmission by one of the network nodes (which also acts as the source in this first stage). In other embodiments, it may be broadcast by a source outside the network of K nodes (e.g., a drone or a satellite broadcasting this common message to a terrestrial network so that this network may further relay the message to D, otherwise unreachable by the source). In yet other embodiments, it may be shared via a backbone-type network (e.g., a high-speed optical network) distinct from the radio network.

FIG. 2B shows an example of the second self-coherence stage. In some embodiments, the purpose of the self-coherence process is to produce the matrix $\Delta\varnothing=\{\delta\varnothing_{ij}\}$; $i\neq j$; $i, j=1, 2, \ldots, K$, where $\delta\varnothing_{ij}=2(\partial_i-\partial_j)$, where $\partial_i$ is the phase of the free-running, carrier-producing oscillator of radio node $N_i$. By definition, $\delta\varnothing_{ii}=0$ for any i. In an example, and as shown in FIG. 2B, this is achieved through a sequence of bi-directional probe-signal exchanges (or signal and message exchanges) between pairs of nodes (i,j).

Once the matrix $\Delta\varnothing$ has been computed fully, a selection process identifies a proper column with desirable characteristics. The column is indexed by the so-called reference node $N_r$, e.g., the column $[\delta\varnothing_{1r}, \delta\varnothing_{2r}, \ldots, \delta\varnothing_{Kr}]$ is computed and stored at each node. The values $\delta\varnothing_{ir}$, $i=1, 2, \ldots, K$, comprise the set of required correction phases that are used in the beamforming stage (Stage 4).

In some embodiments, the matrix $\Delta\varnothing$ is computed by electing a priori a reference node, and computing only the reference column $[\delta\varnothing_{1r}, \delta\varnothing_{2r}, \ldots, \delta\varnothing_{Kr}]$.

In other embodiments, the matrix $\Delta\varnothing$ is computed by performing a round-robin computation, starting from a chosen start node and proceeding sequentially, whereby each node i in the sequence selects its paired node j on the basis of the highest SNR from all links connected to it, the same is repeated by j, provided that the next selected pair node has not already been already covered before, and so on, until all nodes are exhausted. In another example, other link metrics (e.g., the highest signal-to-interference-plus-noise ratio (SINR)) may be used to select the next paired node.

In yet other embodiments, some entries of the matrix $\Delta\varnothing$ may be determined via the use of the identities $2\Delta\theta_{ij}=-2\Delta\theta_{ji}$ and $2\Delta\theta_{ij}=2\Delta\theta_{ik}+2\Delta\theta_{kj}$ (the latter named the "triangle identity"). Alternatively, all entries in $\Delta\varnothing$ are computed using the said identities plus an estimate of the quality (error variance) of the estimated value $\delta\varnothing_{ij}$.

For the computation of the matrix $\Delta\varnothing$ in the embodiments described above, neither a fully connected network (e.g., radio nodes in multiple hops may participate) nor a static network (e.g., dynamic phase tracking may be included in the computation) is required. In some embodiments, the value $\delta\varnothing_{ij}$ can be computed in one of two ways: either via pure bidirectional exchanges of signals or via a mixture of signal exchanges and message exchanges.

Bidirectional signal exchanges. In some embodiments, a pure bidirectional exchange between nodes $N_i$ and $N_j$ includes the node $N_i$ first emitting a signal, e.g., a probe akin to a tone, i.e., $$s_i^{pb}(t)=\cos(2\pi f_c t+\partial_i).$$

In complex-envelope notation, the tone $$s_i^{pb}(t)=\mathrm{Re}\{e^{j\partial_i}e^{j2\pi f_c t}\}$$

and the complex envelope is $$\tilde{s}_i^{pb}(t)=e^{j\partial_i}.$$

A transmission induces a positive phase shift of $\partial_i$ to the transmitted carrier $\cos(2\pi f_c t)$. Correspondingly, the receiver of node $N_j$ mixes the incoming signal with $\cos(2\pi f_c t+\partial_j)$, and thus any reception equivalently subtracts the local phase $\partial_j$. Neglecting the channel gain scaling, the intervening narrowband channel multiplies with the phasor $$e^{j\partial_{i\to j}^{ch}},$$

therein adding the random-variable phase of $$\partial_{i\to j}^{ch},$$

and the total phase at the receiver node $N_j$ is $$\theta_{i\to j}^{total}=\partial_i+\partial_{i\to j}^{ch}-\partial_j.$$

In this exemplary pure bi-directional exchange, node $N_j$ produces, at baseband, the negative of the total phase $$-\theta_{i\to j}^{total} = -\partial_i - \partial_{i\to j}^{ch} + \partial_j$$

(referred to as "conjugation" or "phase reversal"). Upon up-conversion (which adds the phase $\partial_j$), propagation through the reciprocal channel (which adds the phase $$\partial_{i\to j}^{ch}$$

and thus cancels the term $$-\partial_{i\to j}^{ch})$$

and down-conversion at node $N_i$ (which subtracts the phase $\partial_i$), the total phase at the radio baseband of node $N_i$ is $$\theta_{i\leftrightarrow j}^{total} = \left(-\partial_i - \partial_{i\to j}^{ch} + \partial_j\right) + \partial_j + \partial_{i\to j}^{ch} - \partial_i = 2(\partial_j - \partial_i) = -\delta\Phi_{ij}.$$

In some embodiments, node $N_j$ can be informed of this value through the messaging protocol. In other embodiments, node $N_j$ can initiate its own bidirectional exchange with node $N_j$ in order to compute $\delta\varnothing_{ji}$.

Although, in principle, $\delta\varnothing_{ji}=-\delta\varnothing_{ij}$, in practice, such estimates may be noisy. In some embodiments, the network protocol may allow for message exchanges between nodes, and a better estimate of $\delta\varnothing_{ij}$ can be made by both nodes by averaging the individual estimates.

Message and signal exchanges. In some embodiments, a mixture of signal and message exchanges includes the node $N_i$ initiates the emission of a probe, as before, and node $N_j$ computes $$\theta_{i\to j}^{total} = \partial_i + \partial_{i\to j}^{ch} - \partial_j,$$

as described above. In this embodiment, Node $N_j$ sends, to node $N_i$, an information-carrying message containing this computed value of $$\theta_{i\to j}^{total}.$$

Contemporaneously with this message, node $N_j$ emits a probe signal, so that node $N_i$ can in turn compute the phase $$\theta_{j\to i}^{total} = \partial_i + \partial_{j\to i}^{ch} - \partial_j.$$

Under the assumption of channel reciprocity, $$\partial_{i\to j}^{ch} = \partial_{j\to i}^{ch}.$$

Thus, node $N_i$ possesses knowledge of $$\theta_{i\to j}^{total}$$

as well as $$\theta_{j\to i}^{total}$$

and can easily infer that $$\theta_{i\leftrightarrow j}^{total} = \theta_{j\to i}^{total} - \theta_{i\to j}^{total} = -\delta\Phi_{ij}.$$

In some embodiments, and as described in the context of bidirectional signal exchanges, the nodes can repeat that process by now starting from $N_j$, or can share the estimated value of $\delta\varnothing_{ij}$ via messaging.

Figure 2D:
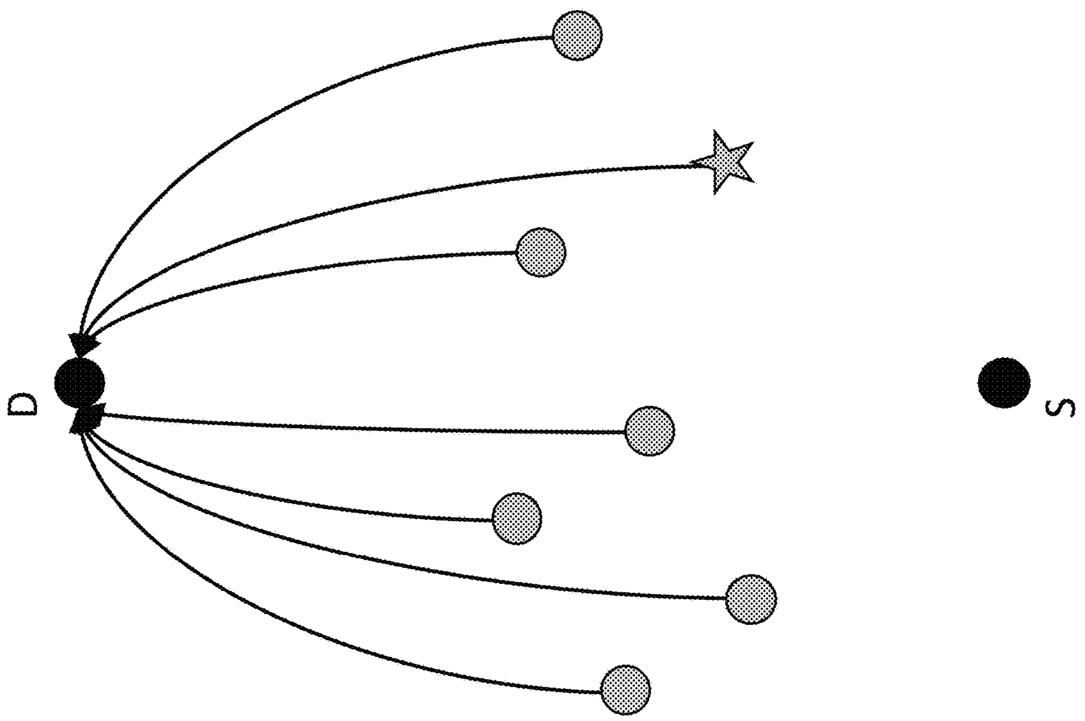
Figure 2C:
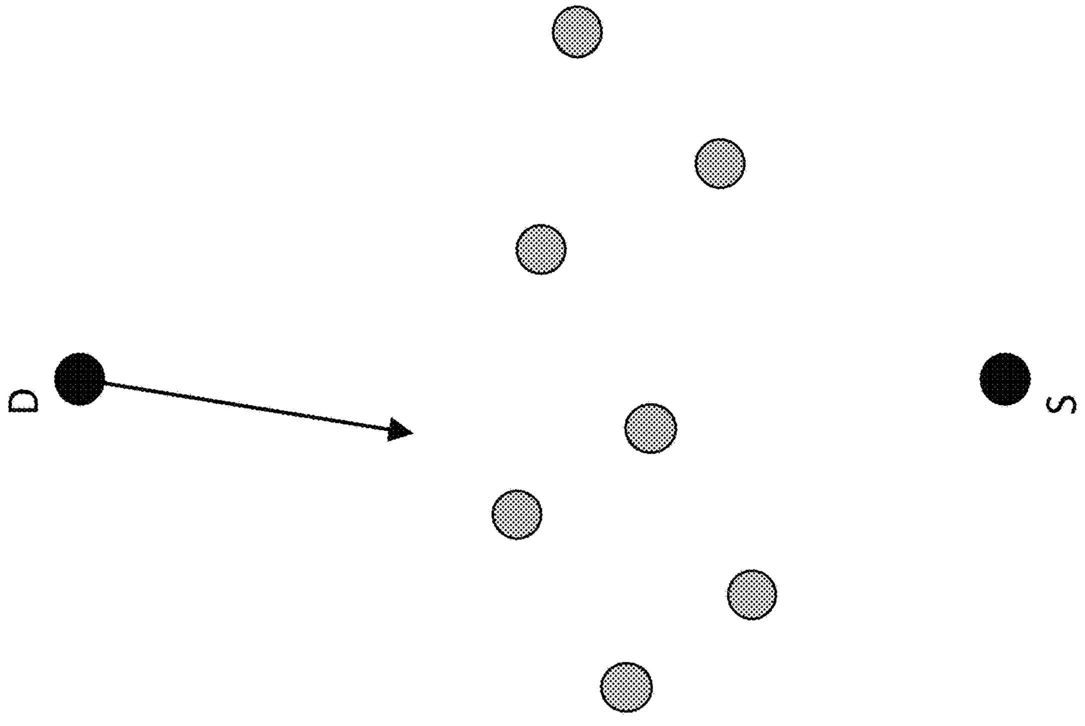

FIG. 2C shows an example of the third per-node phase estimation stage. In some embodiments, the destination node (D) broadcasts a probe, and each of the network nodes computes a tap-spaced, complex-valued baseband channel model in response to receiving the probe from the destination node. At each node, the magnitudes of the estimated taps are compared and the largest is selected, and then used to compute an argument (phase) estimate $$\partial_i^{str\_tap}$$

for each node i=1, 2, . . . , K.

FIG. 2D shows an example of the fourth destination beamforming stage. In some embodiments, the transmission from node $N_i$ is performed with a total correction phase given by $$\partial_i^{total\_corr} = -\partial_i^{str\_tap} = -\delta\Phi_{ir}.$$

In some embodiments, the distributed collaborative beamforming process described in the context of FIGS. 2A-2D results in the destination node D receiving a multitude of taps. The taps arriving at D include (i) those that have been subjected to the processing of Stage 3 and have been subsequently transmitted with the proper phase $$\partial_i^{total\_corr}$$

from each node $N_i$, and (ii) all the remaining taps which have not been processed as per Stage 3 (namely, all taps except the selected strongest). All selected and processed taps contributing to the superimposed (co-transmitted) baseband channel model at the destination node D are in principle phase-aligned, with a common complex-baseband argument (phase) equal to $\delta\varnothing_{rD}$, thus producing a coherent beamforming gain modulo $\delta\varnothing_{rD}$. The remaining non-selected and non-processed channel taps coming from all nodes and contributing to the superimposed channel at D act as noncoherent taps and do not provide beamforming gain, although they provide noncoherent power gains.

2.1 Additional Embodiments for DBF

In some embodiments, all the network nodes are fully connected. The selection of a reference node, which completes Stage 2 with all nodes individually, may be performed in a sequence of its choice, since all nodes are within hearing range of the reference node. The choice of the reference node may pertain to the best average link SNR (averaged over all other nodes). More generally, any function (e.g., average, median, maximum, etc.) of a link-quality metric (e.g., SNR, SINR, etc.) may be used in the determination of the choice of the network node. It is further assumed, in this embodiment, that link-quality information is available to all nodes which share it and update it regularly.

In some embodiments, the reference node may have good access to some but not all the nodes of the network due to some low-quality links. The reference node may identify such impaired-link nodes and request, via proper messages, the help of neighboring nodes (e.g., send a request that they perform bidirectional exchanges with the impaired-link nodes in more favorable link conditions and thus assist in completing the full reference column via the said identities).

In some embodiments, there may be information on the nature of links (e.g., line-of-sight (LoS) or non-LoS (NLoS)), which may be used to determine which links are to be used by each node in its own bidirectional exchanges (e.g., only the LoS links may be used), in the process of filling out the phase matrix.

In some embodiments, an initial node may be chosen either at random, or via a quality metric (e.g., best link SNR among nodes), and is referred to as "node 1". Node 1 completes $\delta Ø_{12}$ with a second node ("node 2"), which may be the node within hearing range of node 1 with the highest link SNR of all links out of node 1. The pair (1,2) is announced via a short message, so that all nodes in the network know which pairs have been covered. Then node 2 completes $\delta Ø_{23}$ with a subsequent node ("node 3"), chosen in a similar manner as before, and the pair is announced, and so on. The process ends when all nodes within hearing range (e.g., one-hop nodes) have been completed. If there are nodes within hearing range in some portion of the network (e.g., in a network of at least 2 hops), then a node from the second hop requests participation to the self-coherence process. The node(s) which hear it extend the process to that node, which then completes the process for those in the second-hop hearing range, and the process repeats until all hops have been covered. Thus, distributed collaborative beamforming can be applied to multi-hop (and not fully connected) networks, provided that the whole multi-hop network is within range of the probe of destination D for the subsequent stages.

In some embodiments, the estimate of the individual terms $\delta Ø_{ij}$ may be accompanied by a quality metric, signifying the confidence of the estimating node on the quality of the said term (e.g., an estimated error variance). The various quality metrics may be distributed in message exchanges and used subsequently to refine estimates either via the use of identities (such as the triangle identity) when completing the matrix $\Delta Ø$, namely by incorporating weighting terms in the computation, or in refining final estimates of reciprocal links ((i→j) and (j→i)), assuming that the protocol allows computation of both. The final quality metrics for all relevant phase-difference qualities may be used for selecting the reference node, e.g., as the one whose column possesses the highest average quality metric. Links for which the quality of the estimate $\delta Ø_{ij}$ is deemed unacceptable (too noisy) may discard the estimate and another sequence of nodes in the computation process may be selected.

In some embodiments, individual links may be subjected to significant interference (e.g., due to jamming). The elements of the matrix corresponding to such corrupted links may be eliminated from the bidirectional signal exchange (phase measurement) process. Instead, the said elements may be filled in via other measurements in related uncorrupted links and the use of the aforementioned identities (e.g., the triangle identity).

In some embodiments, the network nodes may use separate oscillator phases for the transmit and receive modes.

In some embodiments, the terms $\delta Ø_{ij}$ are computed not just by bidirectional signal exchanges between nodes but by a mixture of signal exchanges as well as message exchanges, whereby the messages convey the (quantized) value of the estimated baseband phase of the radio that has received a signal and has computed such a phase. The final estimate of $\delta Ø_{ij}$ is computed by proper combination of the signal phases as well as the massage-conveyed phase values.

In some embodiments, the terms $\delta Ø_{ij}$ are estimated via parameter-tracking methods which account for mobility and phase-noise impairments. Such phase-tracking methods can also be used to fill in (e.g., by prediction) estimated values in case the process is interrupted for a short period of time. In an example, these tracking methods can also be used to reduce the frequency for bidirectional exchanges, thus lowering the network overhead traffic necessary to support the embodiments described in the present document.

In some embodiments, a variety of methods in may be employed in choosing the strongest channel tap for computing the respective phase. In an example, the strongest channel tap is the direct largest gain value among taps. In another example, a complex channel tap is computed via interpolation methods between taps estimated using the observation samples (measurements) of the channel-estimation process.

3 Example Embodiments for CC DSM

The CC DSM framework first groups the $N_T$ transmitters into C clusters via a pre-defined protocol, and each cluster is assumed to have a different data stream to transmit to the destination node. The different data streams are known to each node in that particular cluster, which may be achieved by sharing the particular different data stream (e.g., similar to the DBF operation described with reference to FIG. 2B). Subsequent to the clustering, each cluster beamforms (e.g., similar to the DBF operations described in Section 2 with reference to FIGS. 2C and 2D) to a separate and different element of the receive array at the destination node. For example, cluster 1 performs DBF to antenna 1 of the receive array, cluster 2 performs DBF to antenna 2 of the receive array, and so on, until all clusters have been mapped to all receive elements. In an example, the mapping from cluster to receive element may be pre-defined. In another example, the mapping is based on the pairwise link quality (e.g., SNR, SINR) such that certain utility metrics (e.g., sum rate) are maximized. In yet another example, each antenna element is associated with a unique pilot or probe signal, and a cluster that identifies itself with a particular probe/pilot signal is consequently associated with that antenna element. However, the described embodiments require each cluster be mapped to a unique receive element, i.e., no two clusters with different messages map to the same receive element.

In some embodiments, cluster formation is static, e.g., node membership is determined a priori, whereas in other embodiments, cluster formation is dynamic. In an example, clusters may be formed based on link-quality between nodes and/or message availability, e.g., nodes that can "hear" a particular source are part of the same cluster. Alternatively, if one or more nodes can hear multiple messages, different protocols can be used to assign nodes to clusters. In an example, nodes are assigned so that the difference in cardinalities is minimized (that is, clusters are of roughly equal size, node-count-wise). In another example, the protocol is based on the average SNR per cluster; that is, nodes are assigned as a function of the SNR they create at the destination, so that each cluster (message) corresponds to a similar SNR. In yet another example, node assignments to clusters are performed to maximize the angular separation between the clusters with respect to the destination, using available location information, e.g., location information provided by positioning systems, e.g., GPS.

In some embodiments, the clustering stage may be performed using a control channel and the transmission of the phase-aligned message may be over a data channel that is different from the control channel. In other embodiments, the various metrics (e.g., both local and remote sensing observables) used to determine the optimal clusters for the transmitting nodes may be accessible through an application programming interface (API) that advantageously enables a third-party to use the underlying CC DSM framework in specific scenarios.

With regard to the simultaneous co-transmission of messages by the clusters to the destination node with multiple receive elements, the power allocated to the cooperating nodes in a cluster may be determined in a number of ways.

In an example, the total power used by all the cooperating nodes in a cluster is limited to a predetermined amount that is identical for all clusters. Herein, a reference node (or a cluster head) is configured to broadcast the number of nodes ($N_{t,i}$ for the i-th cluster) in that cluster to all the nodes in that cluster, and each node transmits at $1/N_{t,i}$ of its maximum power, thereby resulting in a constant power transmitted by each cluster (and which power is independent of the number of nodes per cluster).

In another example, the total power used by all the cooperating nodes in a cluster is unconstrained. Herein, each cluster uses a total transmit power that is simply the sum of the transmit powers of the individual nodes in that cluster, and each node is configured to transmit at a maximum power when using a continuous phase modulation (CPM) waveform. When using another waveform, the transmit power can be adjusted (e.g., backed-off) accordingly.

3.1 Example of an RF Communication Model for CC DSM

In some embodiments, a network implementing CC DSM includes $N_T$ spatially distributed, single-antenna transmitters, plus a privileged destination receiver with multiple ($N_R$) antennas. The transmitters are grouped into C clusters such that each cluster possesses a different data stream (message). Clusters may represent distinct subnets of the network, wherein a source node in each cluster originates a message that is heard by the nodes in that cluster, e.g., by a broadcast transmission. Alternatively, the per-cluster message may be a different segment of a data stream that is generated by a single source node, and is available to all transmitting nodes in the network.

As an example, and for developing various aspects of the disclosed technology, it is assumed that the number of clusters is equal to the number of destination receive antennas, i.e., $C=N_R$, and for simplicity, that each cluster contains exactly $$N_T^{(C)} > 1$$

transmitter, therefore $$N_T = N_T^{(C)} C > C. \tag{1}$$

Figure 3:
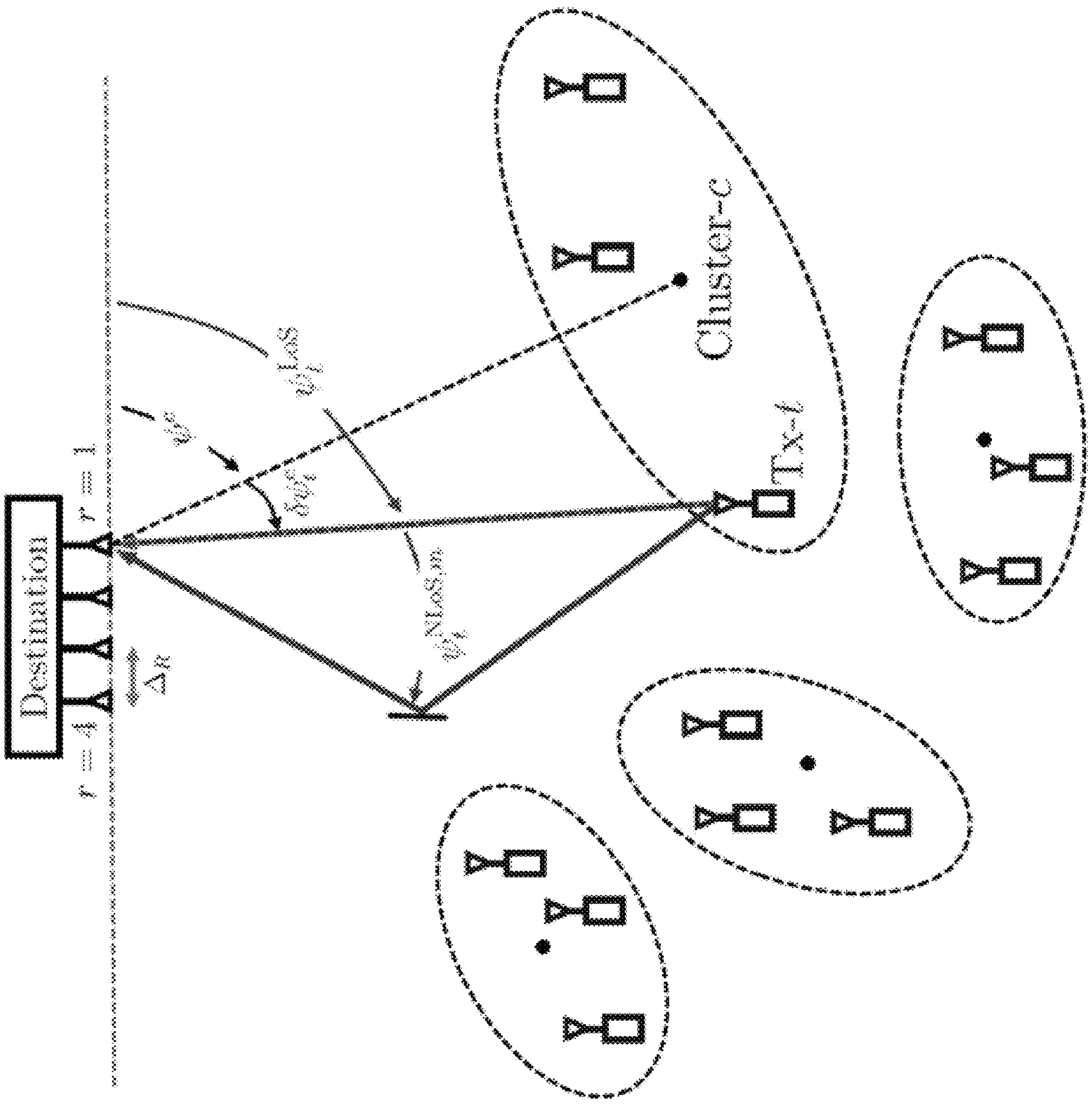
FIG. 3 shows an example of a radio frequency (RF) model for implementing clustered coherent distributed spatial multiplexing (CC DSM).

FIG. 3 illustrates an example uplink radio frequency (RF) communication model in the two-dimensional plane that includes the transmitters and the destination receiver, for $C=N_R=4$ and $$N_T^{(C)} = 3.$$

Cluster-c is defined via its orientation, $\psi^c$, with respect to the first element of the destination antenna array, which, without loss of generality, is assumed to have uniform linear geometry with aperture spacing $\Delta_R$, normalized to the wavelength of transmissions. The angular separation of transmitter-t from the center of its cluster is denoted by $$\delta\psi_t^c.$$

The notation $t \in c$ is used to denote membership of transmitter-t in cluster-c.

The propagation channel is assumed to be frequency nonselective, representative of narrowband signals that do not resolve RF reflections, or of individual subcarriers of a wideband multicarrier signal, such as OFDM. Using the complex baseband equivalent notation, the line-of-sight (LoS) component of the propagation channel to destination antenna-r from transmitter-t is $$g_{r,t}^{LoS} = e^{j\left(2\pi\Delta_R(r-1)\cos\left(\psi_t^{LoS}\right)+\phi_t^{LoS}\right)} \tag{2}$$
$$t \in \{1, 2, \ldots, N_T\},\ r \in \{1, 2, \ldots, N_R\}$$

Herein, $$\psi_t^{LoS} = \psi^c + \delta\psi_t^c \tag{3}$$

is the LoS angle-of-arrival (AoA) and $$\psi_t^{LoS}$$

is the RF phase change of the carrier as a function of the distance from the transmitter-t to the first element of the destination array. The non-line-of-sight (NLoS) component of the propagation channel is modeled as the sum of M components (M>1)

$$g_{r,t}^{LoS} = \frac{1}{\sqrt{M}} \sum_{m=1}^{M} e^{j\left(2\pi\Delta_R(r-1)\cos\left(\psi_t^{NLoS,m}\right)+\phi_t^{NLoS,m}\right)}. \tag{4}$$

Herein, $$\psi_t^{NLoS,m} = \psi_t^{LoS} + \delta\psi_t^{NLoS,m} \tag{5}$$

is the AoA component of the m$^{th}$ NLoS component (with difference of $$\delta\psi_t^{NLoS,m}$$

from the LoS component) and $$\phi_t^{NLoS,m}$$

is the RF phase change due to propagation. For each transmitter, M>>1 NLoS components with independent random phase variables $$\{\phi_t^{NLoS,m}\}$$

are assumed so that the magnitude of $$g_{r,t}^{NLoS}$$

is a random variable of (approximate) Rayleigh distribution with unit power. A weighted sum of LoS and NLoS components yields the combined propagation channel $$g_{r,t} = \sqrt{\frac{\kappa}{1+\kappa}} g_{r,t}^{LoS} = \sqrt{\frac{1}{1+\kappa}} g_{r,t}^{NLoS} \tag{6}$$

Herein, $\kappa \geq 0$ is the Rice factor.

A baseband modulation symbol, $x_t$, of transmitter-t undergoes frequency upconversion, RF channel transformation (6), and frequency downconversion prior to the digitization at the destination. The overall (baseband-to-baseband) channel between the digital chains of transmitters and the destination radio is therefore modeled as $$h_{r,t} = g_{r,t} e^{j(\theta_t - \theta_D)}. \tag{7}$$

Herein, $\theta_t$ is the phase of the local carrier generated by transmitter-t, independent across transmitters, and $\theta_D$ is the phase of the local carrier (e.g., defined with respect to the beginning of codewords, upon transmission and reception) generated by the destination radio, common to the receive chains associated with each antenna.

For clustered DSM, the vector, $x=[x_1, \ldots, x_{N_T}]^T$, of co-transmitted modulation symbols can be represented as $$x = P_{DSM} s. \tag{8}$$

Herein, $s=[s_1, \ldots, s_C]^T$ is the vector of data symbols, one for each per-cluster stream, and $$P_{DSM} \in \mathbb{C}^{N_T \times C} \tag{9}$$

is a distributed precoding matrix with $|(P_{DSM})_{t,c}|=1_{t\in c}$. Defining the overall uplink channel as $$H \in \mathbb{C}^{N_R \times N_T}, (H)_{r,t} = h_{r,t}, \tag{10}$$

the complex-baseband signal model for clustered DSM is $$y = \sqrt{P_s} Hx + w \tag{11}$$

$$= \sqrt{P_s} H_{DSM} s + w \tag{12}$$

where $$H_{DSM} = HP_{DSM} \in \mathbb{C}^{N_R \times C} \tag{13}$$

is the overall DSM channel as experienced by the vector, s, of data symbols, and $w=[w_1, \ldots, w_{N_R}]^T$ is zero-mean circularly symmetric white Gaussian noise vector with $\mathbb{E}(ww^\dagger)=P_w I$. Without loss of generality, the data symbol vector is normalized such that $\mathbb{E}(ss^\dagger)=I$ and $\mathbb{E}(s)=0$.

Assuming uniform emitted power across distributed transmitters, $P_s$ represents the average received signal power at each destination antenna due to a single transmission. The average signal-to-noise-ratio (SNR) of a link between transmitter-t and destination antenna-r is defined as $$\text{Link-}SNR = P_s / P_w. \tag{14}$$

When individual transmissions are subject to uncorrelated channels, the SNR experienced by any single data stream (denoted Stream-SNR, which upper bounds the SNR that each stream will experience at the output of any spatial filtering for stream separation) is $$\text{Stream-}SNR = N_T^{(C)} \times \text{Link-}SNR. \tag{15}$$

The described embodiments adapt standard DBF for single receive antennas, to the case of multiple receive antennas, wherein transmitters in each cluster form a coherent beam targeting a different element of the destination array. The distributed precoding matrix associated with CC DSM is given by $$(P_{CC\text{-}DSM})_{t,c} = e^{j\phi_{r_c,t}} \mathbb{1}_{t\in c} \tag{16}$$

Herein, $\phi_{r_c,t}$ is a phase rotation applied by transmitter-t to its digital data stream for beamforming from cluster-c towards receive aperture-$r_c$. For maximal coherence gains, the baseband phase rotations are selected such that the distributed transmissions of stream-c arrive at the destination aperture-$r_c$ with the same phase. Thus, the magnitude of the overall CC DSM channel is then given by $$\left|(H_{CC-DSM})_{r,c}\right| = \begin{cases} \sum_{t:t\in c} |g_{r_c,t}|, & r = r_c \\ \left|\sum_{t:t\in c} g_{r,t} e^{j(\theta_t + \phi_{r_c,t})}\right|, & r \neq r_c \end{cases}. \tag{17}$$

As seen above in (17), non-coherent gains are available for all other receiver apertures that fall outside the beam.

The formulation of baseband phase rotations $\{\phi_{r_c,t}\}$, referred to as DBF phase calibration, can be accomplished by a straightforward extension of a plurality of standard DBF protocols. In an example, closed-loop DBF systems rely on uplink probes, used by the destination radio to learn the relative phases of arrivals between the transmissions, and subsequently to instruct (via explicit downlink messaging) each transmitter to adjust its phase accordingly. In another example, open-loop DBF phase calibration, which exploits the reciprocity of the propagation channels to eliminate the need for uplink probe signaling from and downlink control messages to each transmitter.

The CC DSM formulation described above enables the performance of CC DSM to be compared with other existing collaborative communication implementations, as described in Section 3.3, where CC DSM is compared to clustered incoherent DSM (CI-DSM) and distributed singular value decomposition (D-SVD).

Figure 4A:
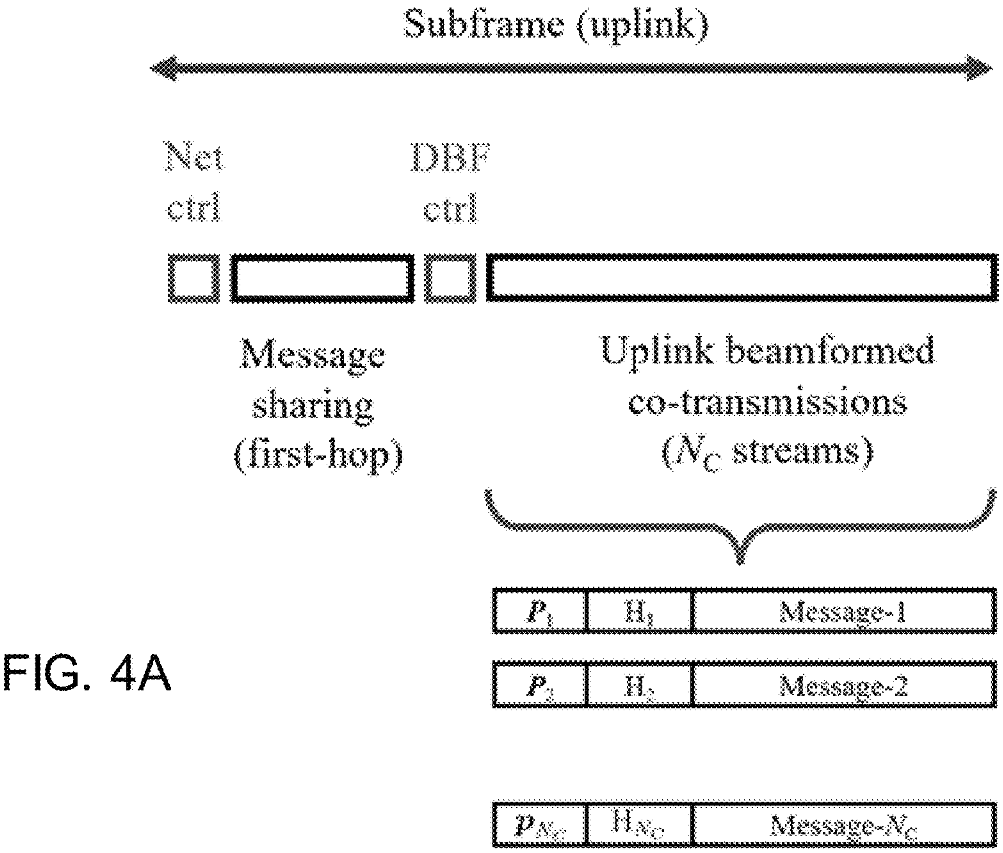
FIG. 4A shows an example frame structure for implementing an uplink in CC DSM.

In some embodiments, CC DSM is configured to use the example frame structure shown in FIG. 4A. As shown therein, the frame structure for CC DSM includes a network control timeslot (denoted "Net ctrl") that is used for scheduling, time and/or frequency synchronization, and/or clustering, a message sharing timeslot (similar to the DBF timeslot shown in FIG. 2B), a DBF control timeslot (denoted "DBF ctrl") that is used by the nodes in the clusters to receive the probe (or more generally, the downlink signal) from the destination node, and an uplink transmission timeslot for uplink beamformed co-transmissions from each of the C clusters. As shown in FIG. 4A, each beamformed co-transmission from a cluster includes a probe (e.g., a distinct sequence per cluster that is used for channel estimation by the destination node), a header (e.g., for the cluster-id and message-id), and the message (e.g., encoded source data).

In some embodiments, the downlink probe (e.g., from the destination node to a node in a cluster in the "DBF ctrl" timeslot) will be associated with a cluster and/or spatial stream. In an example, this may be accomplished implicitly based on a time-division multiple access (TDMA) schedule in a TDMA system (or any "round robin" schedule). In another example, this may be accomplished implicitly by using different probes that are issued by each of the different antennas (e.g., using simultaneous orthogonal codes or orthogonal training sequences). In yet another example, this may be accomplished explicitly by a downlink transmission that includes the probe plus a short message indicating cluster ID (equivalently, an issuing antenna ID).

3.2 Downlink Transmissions in the CC DSM Framework

In certain operational scenarios, the distinct messages from each of the multiple clusters need to be disseminated to each of the other clusters. In these cases, the uplink CC DSM framework, described above, can be combined with downlink transmissions from the destination node with multiple antennas.

In a naïve implementation, which does not leverage CC DSM embodiments described herein, each of the C clusters uses a separate timeslot to transmit its message to the destination node, thereby requiring C timeslots. Then, the destination node uses C timeslots to broadcast each of the messages in its own timeslot. Thus, the naïve implementation uses 2×C timeslots.

Figure 4B:
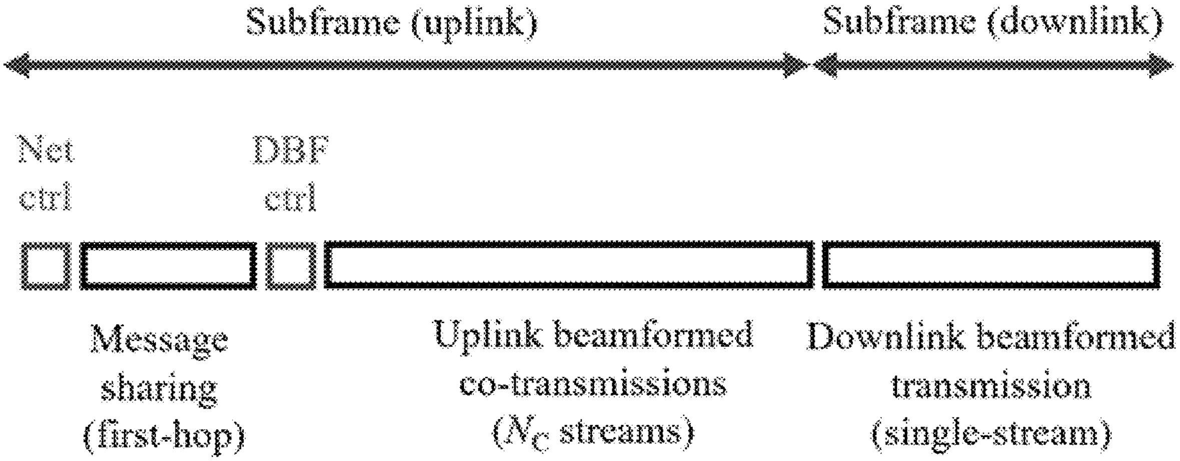
FIG. 4B shows an example frame structure for implementing an uplink and a downlink in CC DSM.

Alternatively, the C clusters use CC DSM to send all the messages to the destination node in a single timeslot, and then the destination node (as in the case above), uses C timeslots to broadcast each of the messages in its own timeslot. This implementation, which leverages the CC DSM implementations described herein and uses the frame structure shown in FIG. 4B (that only shows one of the C timeslots used by the destination node), requires C+1 timeslots.

Alternatively, the C clusters use CC DSM (as in the case above) to send the messages to the destination node in a single timeslot, and then the destination node uses one timeslot to beamform each source message separately to the remaining (non-source) C−1 clusters. This implementation also requires C+1 timeslot, but each cluster receives the messages of the other clusters with a higher fidelity metric, e.g., a higher SNR, than the previous alternative.

3.3 Numerical Results Illustrating the Efficacy of CC DSM

The performance of the described CC DSM embodiments is compared to that of clustered incoherent DSM (CI-DSM), distributed singular value decomposition (D-SVD), and Barrage Relay networking (BRn).

BRn is a communication protocol wherein radios cooperate autonomously, by relaying a common message that was received and decoded in a previous hop, offering spatial diversity in the form of incoherent co-transmissions of a single message stream. Details of the BRn framework and example implementations can be found in at least U.S. Pat. Nos. 8,964,629, 8,588,126, 8,897,158, 9,054,822, an 9,629,063.

In CI-DSM, clusters simply co-transmit the respective data streams incoherently towards the $N_R$ receive antennas, as in the BRn protocol. The precoding matrix for CI-DSM is $$(P_{CI-DSM})_{t,c} = \mathbb{1}_{t\in c}. \tag{18}$$

This results in the overall DSM channel matrix being given by:

$$(H_{CI-DSM})_{r,c} = e^{-\theta_D} \sum_{t:t\in c} g_{r,t} e^{j\theta_t} \tag{19}$$

Herein, $g_{r,t}$ is the propagation channel of (6). It is noted that beyond message sharing and network time/frequency synchronization, CI-DSM incurs no overhead.

D-SVD is a fictitious protocol that provides an upper bound on the performance of CC-DSM, and relies on the singular value decomposition (SVD)

$$H = \sum_{i=1}^{N_R} \sqrt{\lambda_i}\, u_i v_i^{\dagger} \tag{20}$$

of the overall uplink channel (10), wherein $v_i$ and $u_i$ are the orthonormal sets of transmit- and receive-side eigenvectors, respectively, with corresponding non-zero singular values $\{\lambda_i\}$ with $\lambda_i \geq \lambda_{i+1} > 0$. Mimicking MIMO systems with co-located transmit apertures, the D-SVD protocol transmits each of the C different data streams on a different spatial eigenmode. The overall channel for D-SVD can be derived as $$H_{D\text{-}SVD} = \alpha \sum_{c=1}^{C} \sqrt{\lambda_c}\, u_c \tag{21}$$

through which C data streams are received with no cross-talk. Note that unlike CC DSM, all transmitters in the D-SVD protocol must have access to all C data streams, and perform message mixing, indicating maximal levels of user cooperation diversity.

FIGS. 5A-5D are example numerical results that compare the performance of CC DSM against CI-DSM and D-SVD in several example scenarios, configured by:

(i) the number, C, and the orientation, $$\{\psi^c\}_{c=1}^{C}$$

of clusters, (ii) the number, $$N_T^{(C)},$$

of transmitters per cluster, (iii) the channel model specified via the Rice factor, κ, applied uniformly across each link per (6), and (iv) a finite alphabet for the data symbols of each stream.

Associated with each scenario is a distribution of the overall channel as a function of the distribution of remaining system parameters, which are randomized across channel instances. For all scenarios, the destination radio has $N_R = C$ antennas with normalized spacing $\Delta_R = 1/2$. For CC DSM, cluster-c beamforms toward destination aperture-c, i.e., $r_c = c$.

Figure 5A:
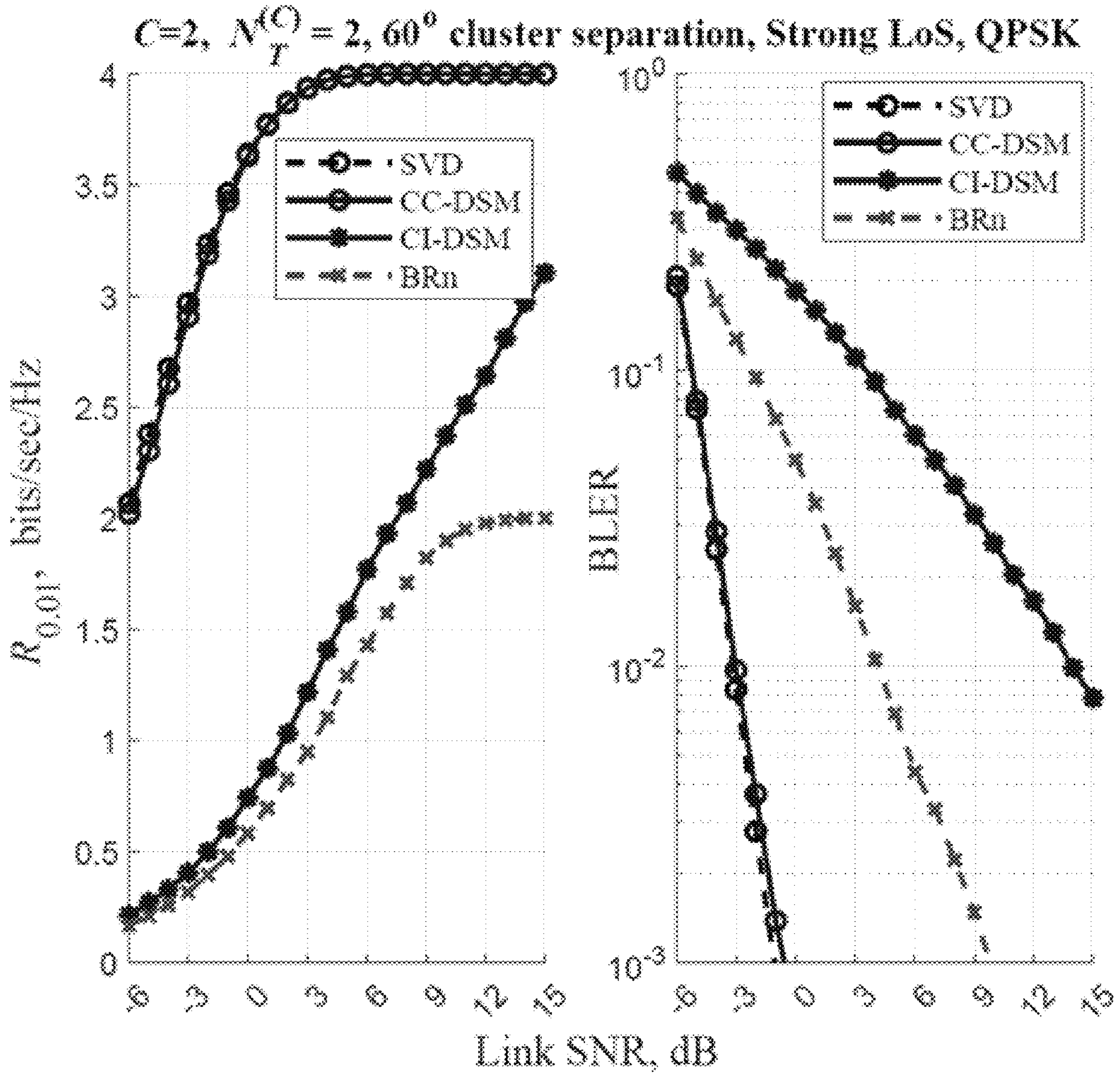
FIGS. 5A-5D are example numerical results that compare the performance of CC DSM with other existing collaborative communication implementations.

The primary metric for performance comparison is the ∈-outage capacity. Outage capacity results are complemented by coded block-error-rate (BLER) estimates from simulations using a quasi-static model for channel application. Performance differences are explained through the statistics of two auxiliary metrics: the energy metric, $$\mu_{energy} = \frac{1}{C} tr\left(H_{DSM} H_{DSM}^{\dagger}\right) \tag{22}$$

describing the energy per data stream, and the rank metric, $$\mu_{rank} = \frac{\lambda_{min}\left(H_{DSM} H_{DSM}^{\dagger}\right)}{\lambda_{max}\left(H_{DSM} H_{DSM}^{\dagger}\right)} \tag{23}$$

indicating the relative strengths of the spatial eigenmodes of the overall DSM channel. FIGS. 5A-5D correspond to Scenarios 1-4, respectively, wherein:

Scenario 1 configures C=2 clusters (with 2 nodes per cluster) with 60° and 120° cluster separation, strong LoS conditions defined by κ=10 dB and a QPSK signal set. FIG. 5A displays the outage capacity and BLER a function of link SNR. CC DSM performs similarly to D-SVD, with approximately same energy and rank statistics, as shown by Table I. In comparison, CI-DSM suffers loss of rank and energy, impacting both the slope and the shift of the performance curves. The BRn protocol, which delivers a single spatial stream across all four transmitters, enjoys limited diversity due to the strong LoS nature of the links.

TABLE I

Statistics of auxiliary metrics for Scenario 1.

| Aux. | (Mean, standard deviation) | | |
|---|---|---|---|
| Metric | CI-DSM | CC-DSM | D-SVD |
| $\mu_{energy}$ | (4.0, 2.1) | (7.7, 1.6) | (8.0, 1.7) |
| $\mu_{rank}$ | (0.34, 0.25) | (0.64, 0.15) | (0.65, 0.15) |

Figure 5B:
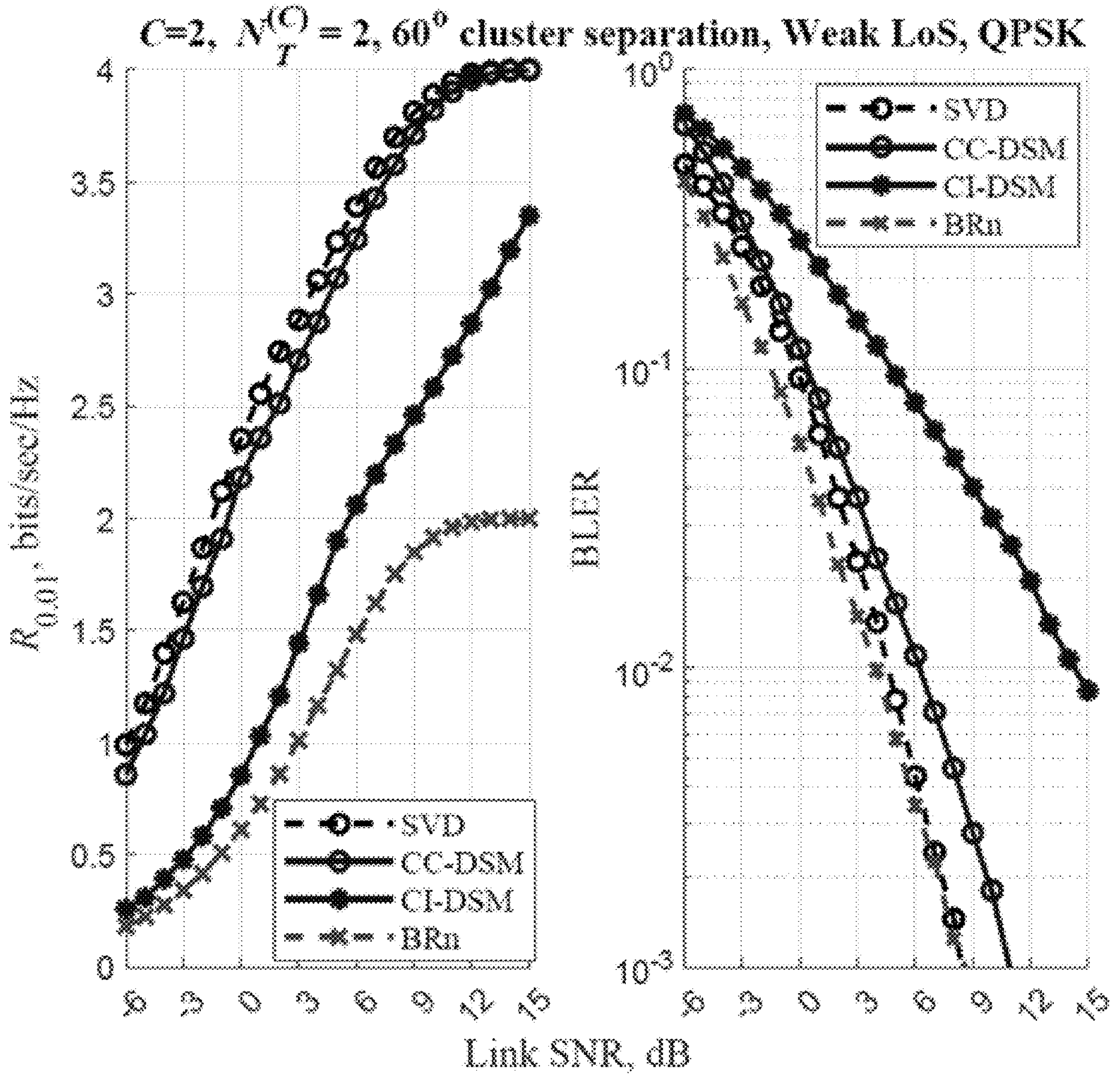

Scenario 2 differs from Scenario 1 only in the channel model, assuming weak LoS conditions with κ=−10 dB. FIG. 5B displays the outage capacity and BLER a function of link SNR. CC-DSM performs within a few dB of the theoretical D-SVD, but both schemes suffer rank loss with respect to Scenario 1, as displayed in Table II.

TABLE II

Statistics of auxiliary metrics for Scenario 2.

| Aux. | (Mean, standard deviation) | | |
|---|---|---|---|
| Metric | CI-DSM | CC-DSM | D-SVD |
| $\mu_{energy}$ | (4.0, 2.7) | (7.0, 3.4) | (8.0, 3.8) |
| $\mu_{rank}$ | (0.31, 0.22) | (0.43, 0.21) | (0.45, 0.21) |

Figure 5C:
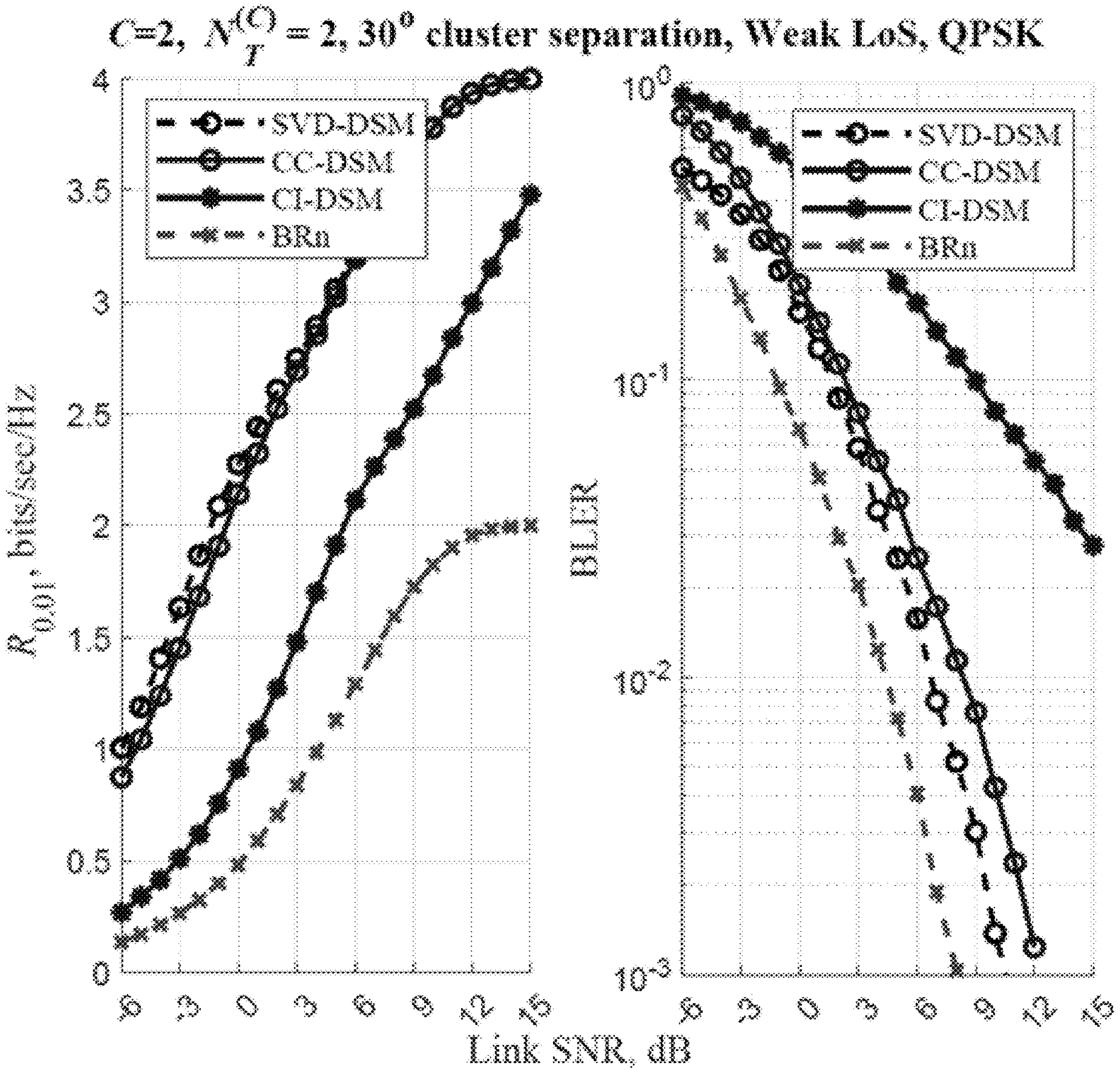

Scenario 3 reconfigures Scenario 2 with 75° and 105° cluster separation. The reduced cluster separation results in poor rank for all DSM variants, as displayed in Table III. FIG. 5C shows that CC-DSM still performs within a few dB of D-SVD.

TABLE III

Statistics of auxiliary metrics for Scenario 3.

| Aux. | (Mean, standard deviation) | | |
|---|---|---|---|
| Metric | CI-DSM | CC-DSM | D-SVD |
| $\mu_{energy}$ | (4.0, 2.7) | (6.9, 3.4) | (8.0, 3.8) |
| $\mu_{rank}$ | (0.13, 0.10) | (0.15, 0.09) | (0.16, 0.09) |

Figure 5D:
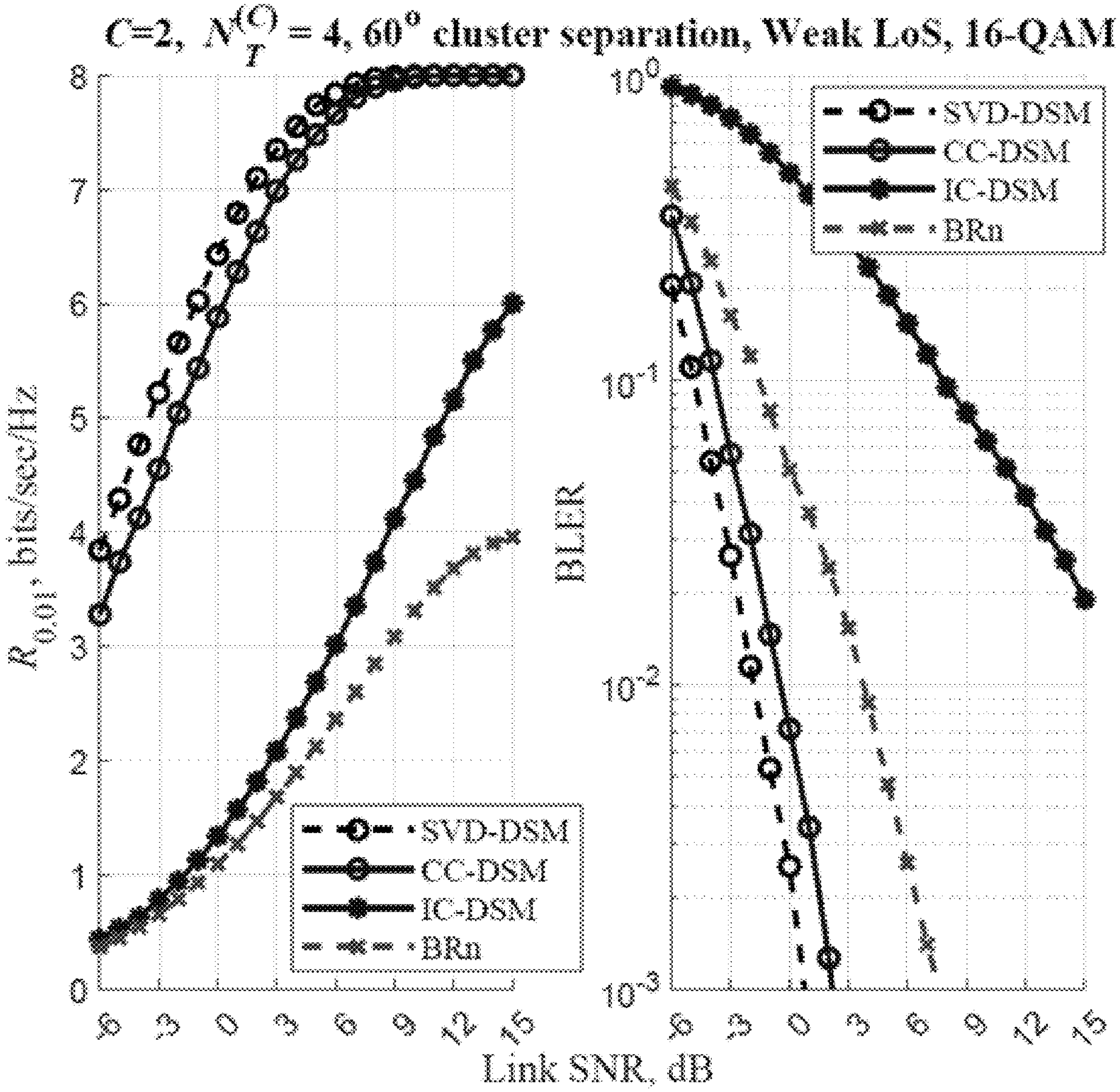

Scenario 4 considers $$N_T^{(C)} = 4$$

transmitters per cluster and 16-QAM signal set, with the rest of the configuration identical to that of Scenario 2. FIG. 5D displays the simultaneous increase (as compared to Scenario 2) in outage capacity and reliability due to the increase in collaborative diversity. CC-DSM harvests sufficient energy due to phase coherence (Table IV) to outperform the maximal-diversity BRn scheme, while delivering twice the uplink throughput.

TABLE IV

Statistics of auxiliary metrics for Scenario 4.

| Aux. | (Mean, standard deviation) | | |
|---|---|---|---|
| Metric | CI-DSM | CC-DSM | D-SVD |
| $\mu_{energy}$ | (8, 5.5) | (26, 9.3) | (32, 10.7) |
| $\mu_{rank}$ | (0.31, 0.21) | (0.55, 0.19) | (0.56, 0.18) |

As shown in FIGS. 5A-5D and discussed above, CC DSM produces a higher multiplexing gain (more messages relayed per channel use) than plain incoherent co-transmission of a single message; effectively capturing the degrees of freedom of the receiver apertures. The CC DSM gains are quite comparable to the global idealized gains of SVD, indicating a simple but very effective means of realizing the broader vision of virtual MIMO in a distributed ad hoc network.

4 Example Implementations of the Disclosed Technology

Figure 6:
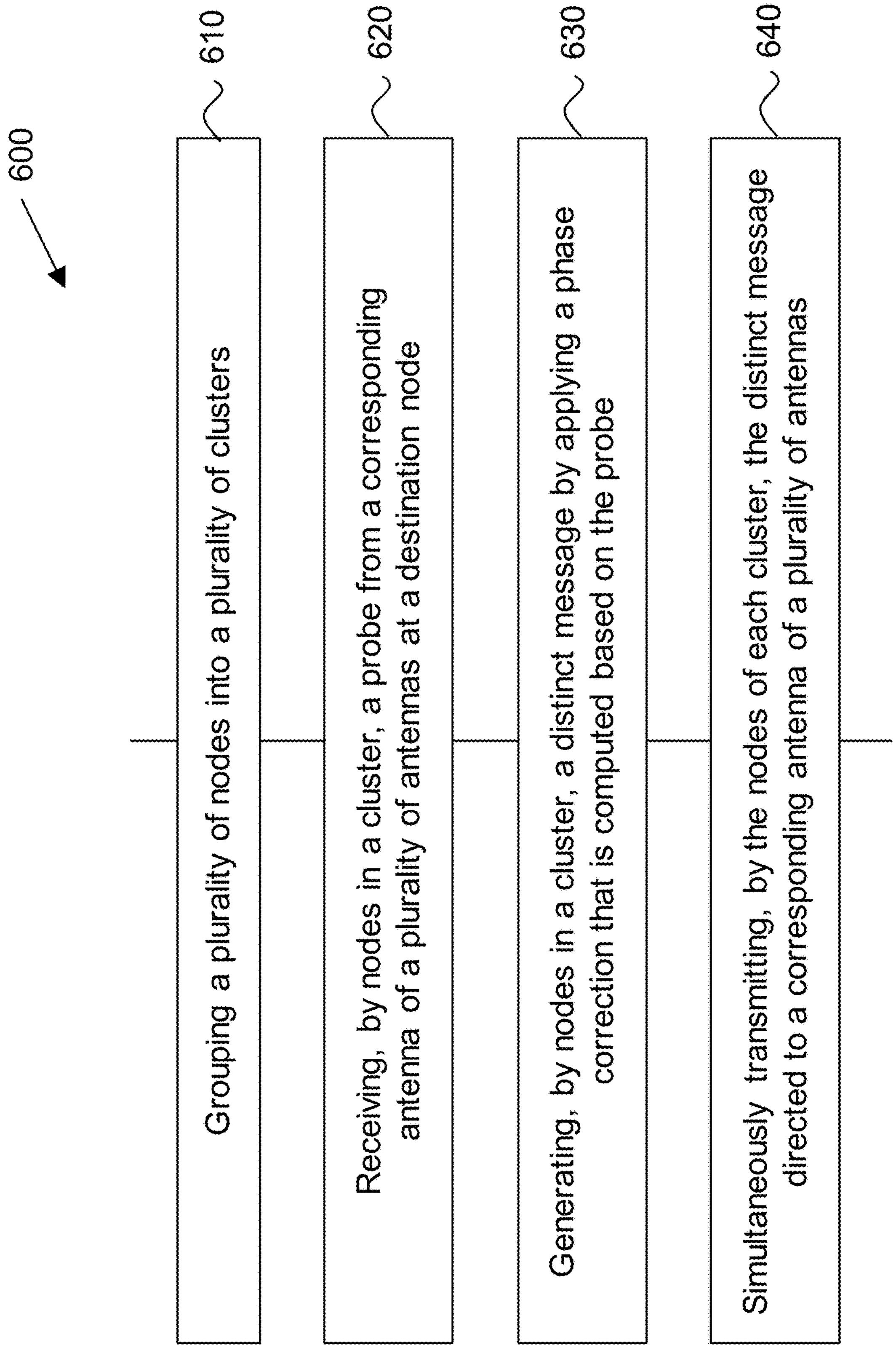
FIGS. 6 and 7 are flowcharts for example methods of collaborative communication.

FIG. 6 is a flowchart of an example method for cooperative communication. The method 600 includes, at operation 610, grouping a plurality of nodes into a plurality of clusters. Different mechanisms used to group the nodes into clusters are described in Section 3.

The method 600 includes, at operation 620, receiving, by nodes in a cluster, a probe from a corresponding antenna of a plurality of antennas at a destination node. In an example, this is similar to Stage 3 of DBF, which is described in Section 2 and with reference to FIG. 2C.

The method 600 includes, at operation 630, generating, by nodes in a cluster, a distinct message by applying a phase correction to a message, the phase correction being computed based on the probe.

The method 600 includes, at operation 640, simultaneously transmitting, by the nodes of each cluster, the distinct message directed to a corresponding antenna of a plurality of antennas. The simultaneous transmission is based on the clusters performing distributed beamforming, which is detailed in Section 2.

Figure 7:
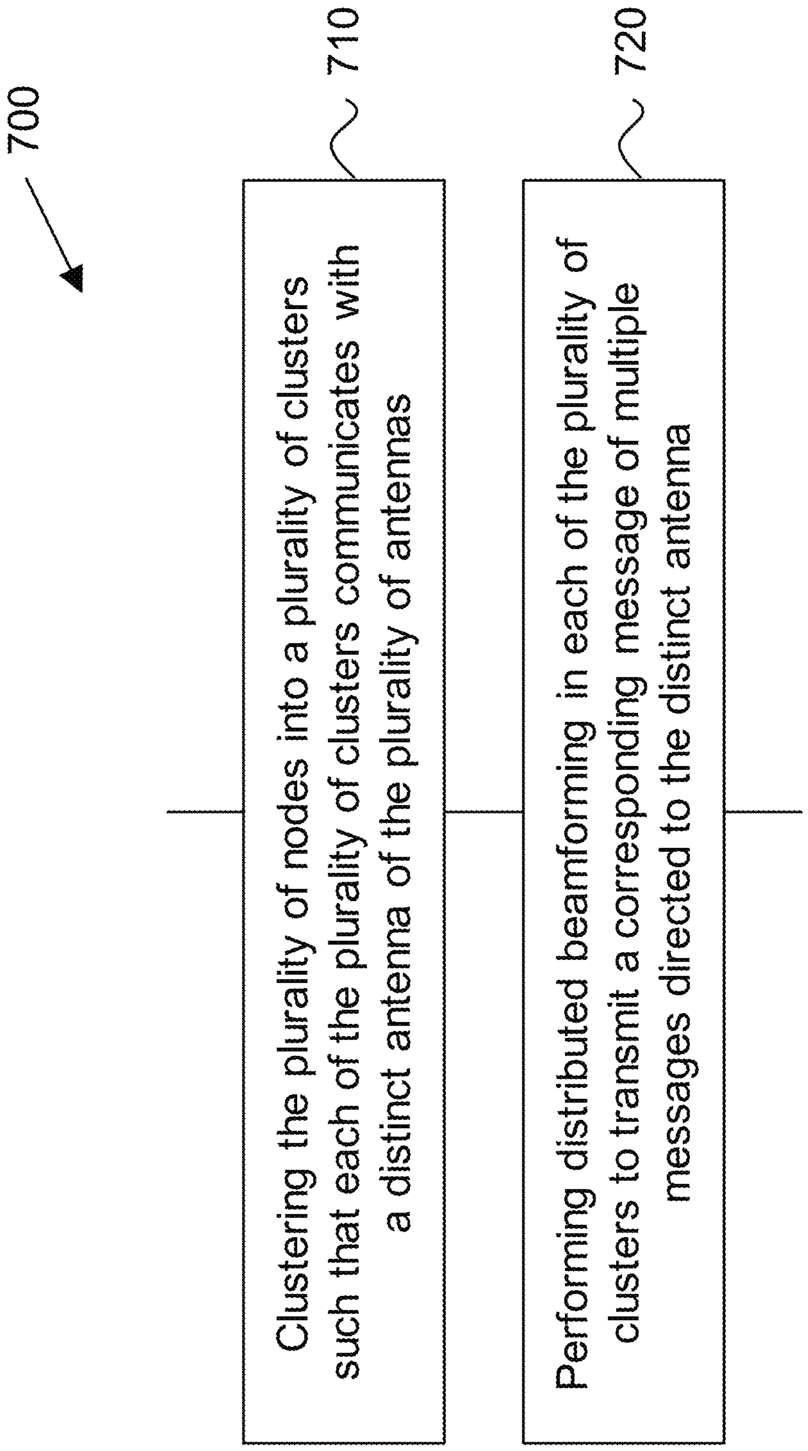

FIG. 7 is a flowchart of another example method for cooperative communication. The method 700 includes, at operation 710, clustering the plurality of nodes into a plurality of clusters such that each of the plurality of clusters communicates with a distinct antenna of the plurality of antennas. Different mechanisms used to group the nodes into clusters are described in Section 3.

The method 700 includes, at operation 720, performing distributed beamforming in each of the plurality of clusters to transmit a corresponding message of multiple messages directed to the distinct antenna. Performing beamforming is detailed in Section 2.

The described embodiments provide, inter alia, the following technical solutions:

1. A system for collaborative communication, comprising: a plurality of nodes; and a destination node comprising a plurality of antennas, wherein the system is configured to: group the plurality of nodes into a plurality of clusters such that each of the plurality of clusters is configured to simultaneously transmit a distinct message directed to a corresponding antenna of the plurality of antennas, and wherein each node in each of the plurality of clusters is configured, prior to transmitting the corresponding distinct message, to: receive, from the corresponding antenna, a probe, and generate the corresponding distinct message by applying a phase correction, wherein computing the phase correction is based on the probe.
2. The system of solution 1, wherein grouping the plurality of nodes into the plurality of clusters is based on an average signal-to-noise ratio (SNR) for each cluster.
3. The system of solution 1, wherein grouping the plurality of nodes into the plurality of clusters is based on an angular separation between each cluster and the destination node.
4. The system of solution 3, wherein the angular separation is based on an angle between a predetermined node in the cluster and the destination node.
5. The system of solution 4, wherein the predetermined node is a node closest to a geographical center of the cluster.
6. The system of solution 4, wherein the predetermined node is determined based on a location of each node in the cluster and a location of the corresponding antenna.
7. The system of solution 1, wherein grouping the plurality of nodes into the plurality of clusters is based on minimizing a difference between sizes of the plurality of clusters.
8. The system of any of solutions 1 to 7, wherein the plurality of clusters comprises a first cluster that transmits a first message and a second cluster that transmits a second message.
9. The system of solution 8, wherein the first message is from a first source and the second message is from a second source different from the first source.
10. The system of solution 8, wherein the first message is a first part of a common message from a source and the second message is a second part of the common message that is non-overlapping with the first part of the common message.
11. The system of any of solutions 1 to 7, wherein grouping the plurality of nodes into the plurality of clusters uses a control channel.
12. The system of solution 11, wherein transmitting the corresponding distinct message uses a data channel different from the control channel.
13. The system of any of solutions 1 to 7, wherein each of the plurality of nodes is a mobile node in an ad-hoc network, and wherein the destination node is a receive array that includes the plurality of antennas.
14. The system of any of solutions 1 to 7, wherein each of the plurality of nodes is a wireless cellular device, and wherein the destination node is a base station.
15. The system of solution 14, wherein the base station is an eNodeB (eNB), a gNodeB (gNB), an en-gNB, or a ng-eNB.
16. The system of any of solutions 1 to 7, wherein each of the plurality of nodes is a wireless device using a Wi-Fi protocol, and wherein the destination node is a Wi-Fi router or a Wi-Fi access point (AP).
17. A method for collaborative communication from a plurality of nodes to a destination node comprising a plurality of antennas, the method comprising: clustering the plurality of nodes into a plurality of clusters such that each of the plurality of clusters communicates with a distinct antenna of the plurality of antennas; and performing distributed beamforming in each of the plurality of clusters to transmit a corresponding message of multiple messages directed to the distinct antenna.

18. The method of solution 17, wherein the performing distributed beamforming comprises: receiving, by each of the plurality of clusters from the corresponding distinct antenna, a probe, wherein the corresponding message is generated by applying a phase correction, and wherein computing the phase correction is based on the probe.
19. The method of solution 17, wherein the multiple messages comprise multiple non-overlapping portions of a common message.
20. The method of solution 17, further comprising: receiving, by the destination node from the plurality of clusters, the multiple messages in a first timeslot.
21. The method of solution 20, wherein the destination node receives the multiple messages by receiving, from each of the plurality of clusters, the corresponding message in the first timeslot.
22. The method of solution 20, wherein a number of the plurality of clusters is an integer C that is greater than one, wherein a number of the multiple messages is C, and wherein a number of the plurality of antennas is an integer NR that is greater than or equal to C.
23. The method of solution 22, further comprising: transmitting, from the destination node in each of C timeslots subsequent to the first timeslot, a corresponding one of the C multiple messages to the plurality of clusters by broadcasting the corresponding message using the NR antennas.
24. The method of solution 22, wherein the multiple messages comprise a first message received from a first cluster, and the method further comprising: transmitting, from the destination node in a second timeslot subsequent to the first timeslot, the first message to at least one of the plurality of clusters.
25. The method of solution 24, wherein NR is equal to C, and wherein the transmitting the first message comprises using the NR antennas to broadcast the first message to each of the plurality of clusters.
26. The method of solution 24, wherein NR is equal to K×C, wherein C is equal to 3, wherein the multiple messages further comprise a second message received from a second cluster and a third message received from a third cluster, wherein the transmitting the first message comprises operating a first K antennas in a first directional mode to transmit the first message to a second cluster, and the method further comprising: transmitting, in the second timeslot, the second message to third cluster by operating a second K antennas in a second directional mode; and transmitting, in the second timeslot, the third message to the first cluster by operating a third K antennas in a third directional mode.
27. The method of any of solutions 17 to 26, wherein (a) each of the plurality of nodes is a mobile node in an ad-hoc network, and wherein the destination node is a receive array that includes the plurality of antennas, or (b) each of the plurality of nodes is a wireless cellular device, and wherein the destination node is a base station, or (c) each of the plurality of nodes is a wireless device using a Wi-Fi protocol, and wherein the destination node is a Wi-Fi router or a Wi-Fi access point (AP).
28. A method of collaborative communication implemented using the system of one or more of solutions 1 to 16.
29. An apparatus for wireless communication comprising a processor, configured to implement the method recited in one or more of solutions 17 to 27.
30. A non-transitory computer readable program storage medium having code stored thereon, the code, when executed by a processor, causing the processor to implement the method recited in one or more of solutions 17 to 27.

Figure 8:
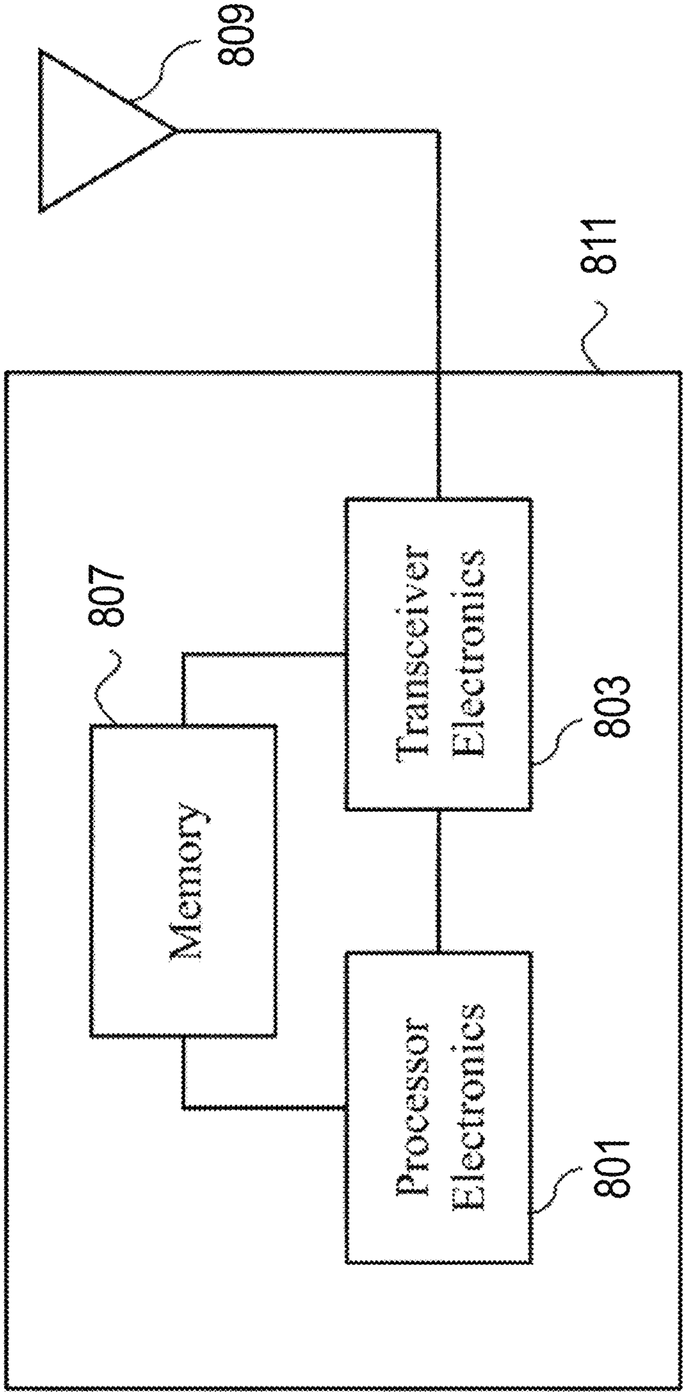
FIG. 8 is a block diagram representation of a portion of a radio that may be used to implement embodiments of the disclosed technology.

FIG. 8 is a block diagram representation of a portion of a radio, in accordance with some embodiments of the presently disclosed technology. A radio 811 can include processor electronics 801 such as a microprocessor that implements one or more of the techniques presented in this patent document (e.g., including methods 600 and 700). The radio 811 can include transceiver electronics 803 to send and/or receive wireless signals over one or more communication interfaces such as antenna(s) 809. The radio 811 can include other communication interfaces for transmitting and receiving data. Radio 811 can include one or more memories 807 configured to store information such as data and/or instructions. In some implementations, the processor electronics 801 can include at least a portion of the transceiver electronics 803. In some embodiments, at least some of the disclosed techniques, modules or functions are implemented using the radio 811.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for collaborative communication, comprising:

a plurality of nodes; and a destination node comprising a plurality of antennas, wherein the system is configured to:

group the plurality of nodes into a plurality of clusters such that each of the plurality of clusters is configured to simultaneously transmit a distinct message directed to a corresponding antenna of the plurality of antennas, and wherein each node in each of the plurality of clusters is configured, prior to transmitting a corresponding distinct message, to:

receive, from the corresponding antenna, a probe, and generate the corresponding distinct message by applying a phase correction, wherein computing the phase correction is based on the probe.

2. The system of claim 1, wherein grouping the plurality of nodes into the plurality of clusters is based on an average signal-to-noise ratio (SNR) for each cluster.

3. The system of claim 1, wherein grouping the plurality of nodes into the plurality of clusters is based on an angular separation between each cluster and the destination node.

4. The system of claim 3, wherein the angular separation is based on an angle between a predetermined node in a cluster and the destination node, and wherein the predetermined node is (a) a node closest to a geographical center of the cluster or (b) determined based on a location of each node in the cluster and a location of the corresponding antenna.

5. The system of claim 1, wherein grouping the plurality of nodes into the plurality of clusters is based on minimizing a difference between sizes of the plurality of clusters.

6. The system of claim 1, wherein the plurality of clusters comprises a first cluster that transmits a first message and a second cluster that transmits a second message.

7. The system of claim 6, wherein the first message is from a first source and the second message is from a second source different from the first source.

8. The system of claim 6, wherein the first message is a first part of a common message from a source and the second message is a second part of the common message that is non-overlapping with the first part of the common message.

9. The system of claim 1, wherein grouping the plurality of nodes into the plurality of clusters uses a control channel, and wherein transmitting the corresponding distinct message uses a data channel different from the control channel.

10. The system of claim 1, wherein:

(a) each of the plurality of nodes is a mobile node in an ad-hoc network, and wherein the destination node is a receive array that includes the plurality of antennas, or (b) each of the plurality of nodes is a wireless cellular device, and the destination node is a base station that is an eNodeB (eNB), a gNodeB (gNB), an en-gNB, or a ng-eNB, or (c) each of the plurality of nodes is a wireless device using a Wi-Fi protocol, and wherein the destination node is a Wi-Fi router or a Wi-Fi access point (AP).

11. A method for collaborative communication from a plurality of nodes to a destination node comprising a plurality of antennas, the method comprising:

clustering the plurality of nodes into a plurality of clusters such that each of the plurality of clusters communicates with a distinct antenna of the plurality of antennas; and performing distributed beamforming in each of the plurality of clusters to transmit a corresponding message of multiple messages directed to the distinct antenna.

12. The method of claim 11, wherein the performing distributed beamforming comprises:

receiving, by each of the plurality of clusters from a corresponding distinct antenna, a probe, wherein the corresponding message is generated by applying a phase correction, and wherein computing the phase correction is based on the probe.

13. The method of claim 11, wherein the multiple messages comprise multiple non-overlapping portions of a common message.

14. The method of claim 11, further comprising:

receiving, by the destination node from the plurality of clusters, the multiple messages in a first timeslot.

15. The method of claim 14, wherein the destination node receives the multiple messages by receiving, from each of the plurality of clusters, the corresponding message in the first timeslot.

16. The method of claim 14, wherein a number of the plurality of clusters is an integer C that is greater than one, wherein a number of the multiple messages is C, and wherein a number of the plurality of antennas is an integer NR that is greater than or equal to C.

17. The method of claim 16, further comprising:

transmitting, from the destination node in each of C timeslots subsequent to the first timeslot, a corresponding one of the C multiple messages to the plurality of clusters by broadcasting the corresponding message using the NR antennas.

18. The method of claim 16, wherein the multiple messages comprise a first message received from a first cluster, and the method further comprising:

transmitting, from the destination node in a second timeslot subsequent to the first timeslot, the first message to at least one of the plurality of clusters.

19. The method of claim 18, wherein NR is equal to C, and wherein the transmitting the first message comprises using the NR antennas to broadcast the first message to each of the plurality of clusters.

20. The method of claim 18, wherein the transmitting the first message comprises operating the NR antennas to form C-1 beams that directionally transmit the first message to each of the plurality of clusters other than the first cluster.

* * * * *